United States Patent [19]
Zehavi

[11] Patent Number: 5,602,833
[45] Date of Patent: Feb. 11, 1997

[54] METHOD AND APPARATUS FOR USING WALSH SHIFT KEYING IN A SPREAD SPECTRUM COMMUNICATION SYSTEM

[75] Inventor: Ephraim Zehavi, Haifa, Israel

[73] Assignee: Qualcomm Incorporated, San Diego, Calif.

[21] Appl. No.: 358,425

[22] Filed: Dec. 19, 1994

[51] Int. Cl.$^6$ ............................ H04B 7/216; H04J 13/02; H04L 27/28

[52] U.S. Cl. .......................... 370/209; 370/335; 375/209; 375/261; 375/340; 379/59; 455/33.1; 455/54.1

[58] Field of Search .............................. 370/18, 19, 21, 370/22, 23, 69.1, 85.13, 95.1, 95.3; 375/200, 205, 206, 324, 325, 329, 331, 340, 208, 209, 210, 260, 261, 262, 264, 267; 379/58, 59, 60; 455/33.1, 38.1, 53.1, 54.1, 11.1, 12.1, 17, 20, 21; 371/43; 380/33, 34

[56] References Cited

U.S. PATENT DOCUMENTS

| | | | |
|---|---|---|---|
| 4,866,395 | 9/1989 | Hostetter | 329/309 |
| 4,888,788 | 12/1989 | Teranishi et al. | 375/200 |

(List continued on next page.)

FOREIGN PATENT DOCUMENTS

| | | | |
|---|---|---|---|
| 0526439 | 2/1993 | European Pat. Off. | H04J 13/00 |
| 9200639 | 6/1990 | WIPO | H04L 27/30 |
| 9314588 | 1/1993 | WIPO | H04L 27/30 |

OTHER PUBLICATIONS

*Digital Communications with Space Applications*, S. W. Golomb et al., Prentice Hall, Inc. 1964, pp. 45–64.

Gregory E. Bottomley, "Signature Sequence Selection in a CDMA System with Orthogonal Coding", *IEEE Transactions on Vehicular Technology*, vol. 42, No. 1, New York, Feb. 1993. pp. 62–68.

Tetsuo Kirimoto et al., "Orthogonal Periodic Sequences Derived from M–Sequences on GF (q)", *IEEE Transactions on Information Theory*, vol. 40, No. 2, New York, Mar. 1994, pp. 526–532.

*Primary Examiner*—Alpus H. Hsu
*Attorney, Agent, or Firm*—Russell B. Miller; Gregory D. Ogrod

[57] ABSTRACT

Method and apparatus for generating orthogonally encoded communication signals for communication system subscribers using multiple orthogonal functions for each orthogonal communication channel. Digital data symbols for signal recipients are M-ary modulated using at least two n-length orthogonal modulation symbols, which are generally Walsh functions normally used within the communication system. These symbols are provided by a modulation symbol selector (124) typically from one or more code generators (126, 128), and the modulation is such that M equals a product of a total number of orthogonal functions and the number used to generate individual modulation symbols. Each group of log M encoded data symbols from data processing elements (100, 102) are mapped into one modulation symbol using the modulation symbol selection element (124) according to their binary values. In some embodiments, a fast Hadamard transformer is used for symbol mapping. The resulting communication signals are demodulated by correlating them with the preselected number of orthogonal functions, in parallel, and demodulating the results into M energy values representing each orthogonal modulation symbol. The energy values are mapped into energy metric data using a dual maximum metric generation process. The correlation and demodulation can be accomplished using at least two sets of N correlators (142), N being the number of functions used, and applying correlated signals to one demodulator for each set of correlators (144). Each demodulator outputs M energy values representing each of the M mutually orthogonal modulation symbols, which are then combined into a single set of M energy values. In further configurations, coherent demodulators (172, 174) can be used to produce amplitude values for received signals which are then combined (178) with dual maximum metric results (170) to produce composite metric values for data symbols (178).

43 Claims, 9 Drawing Sheets

U.S. PATENT DOCUMENTS

| | | | |
|---|---|---|---|
| 4,901,307 | 2/1990 | Gilhousen et al. | 370/18 |
| 5,101,501 | 3/1992 | Gilhousen et al. | 455/33.2 |
| 5,103,459 | 4/1992 | Gilhousen et al. | 375/205 |
| 5,109,390 | 4/1992 | Gilhousen et al. | 375/205 |
| 5,166,951 | 11/1992 | Schilling | 375/200 |
| 5,204,874 | 4/1993 | Falconer et al. | 375/200 |
| 5,228,054 | 7/1993 | Rueth et al. | 375/200 |
| 5,228,056 | 7/1993 | Schilling | 375/200 |
| 5,239,560 | 8/1993 | Daniel | 375/260 |
| 5,267,261 | 11/1993 | Blakeney et al. | 375/205 |
| 5,309,474 | 5/1994 | Gilhousen et al. | 375/205 |
| 5,311,176 | 5/1994 | Gurney | 341/50 |
| 5,414,728 | 5/1995 | Zehavi | 375/230 |
| 5,416,797 | 5/1995 | Gilhousen et al. | 375/205 |
| 5,442,627 | 8/1995 | Viterbi et al. | 370/22 |
| 5,450,453 | 9/1995 | Frank | 375/200 |

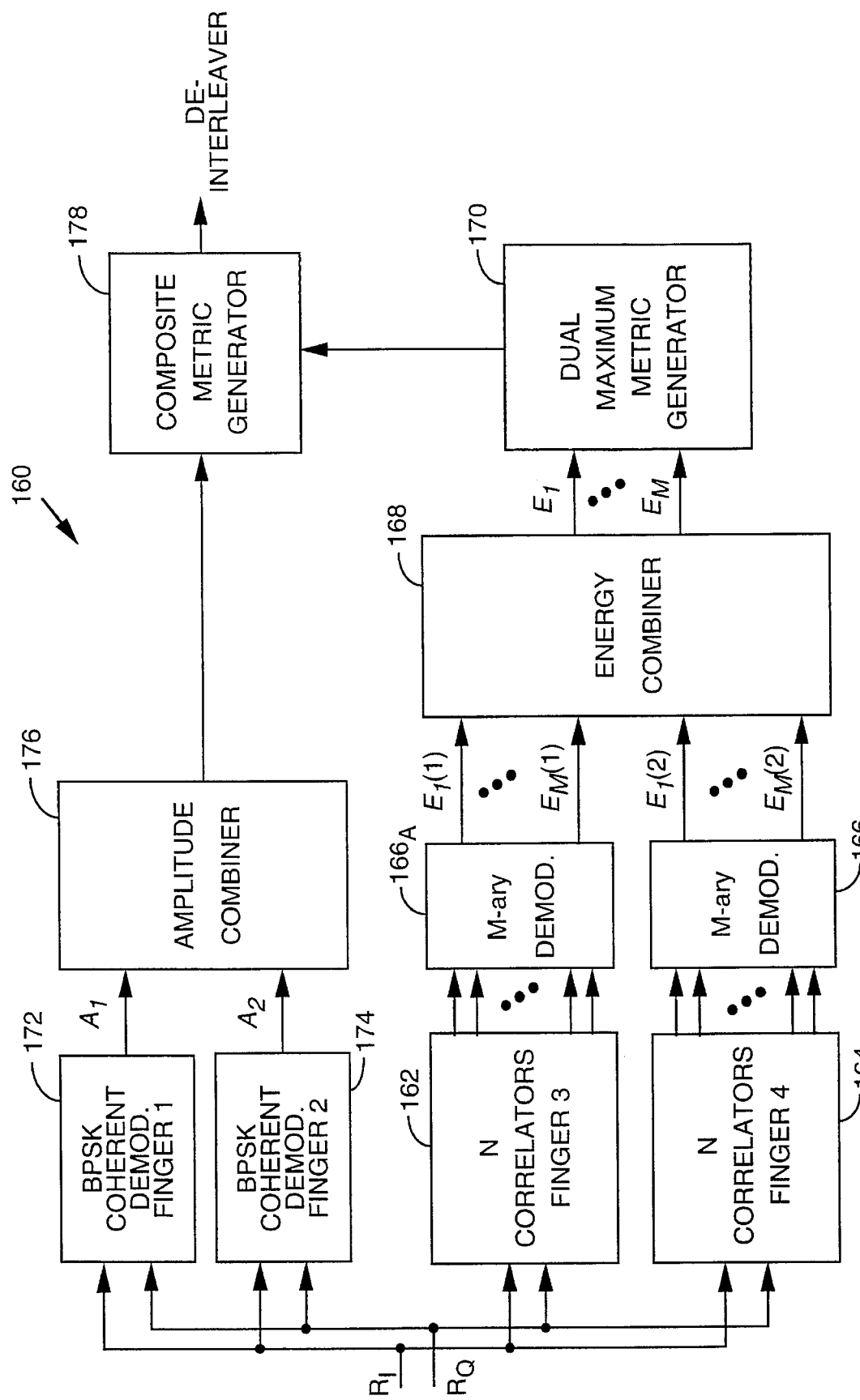

METHOD AND APPARATUS FOR USING WALSH SHIFT KEYING IN A SPREAD SPECTRUM COMMUNICATION SYSTEM

BACKGROUND OF THE INVENTION

I. Field of the Invention

The present invention relates to multiple access communication systems, such as wireless data or telephone systems, and satellite repeater type spread spectrum communication systems. More particularly, the invention relates to a method and apparatus for using multiple orthogonal codes to generate spread spectrum communication signals. The invention further relates to a method of using shift keying of multiple Walsh function code sequences for signal modulation in code division spread spectrum type communication systems to provide system users with improved energy metrics for non-coherent signal demodulation.

II. Description of the Related Art

A variety of multiple access communication systems have been developed for transferring information among a large number of system users. Techniques employed by such multiple access communication systems include time division multiple access (TDMA), frequency division multiple access (FDMA), and AM modulation schemes, such as amplitude companded single sideband (ASCII), the basics of which are well known in the art. However, spread spectrum modulation techniques, such as code division multiple access (CDMA) spread spectrum techniques, provide significant advantages over the other modulation schemes, especially when providing service for a large number of communication system users. The use of CDMA techniques in a multiple access communication system is disclosed in the teachings of U.S. Pat. No. 4,901,307, which issued Feb. 13, 1990 under the title "SPREAD SPECTRUM MULTIPLE ACCESS COMMUNICATION SYSTEM USING SATELLITE OR TERRESTRIAL REPEATERS," is assigned to the assignee of the present invention, and is incorporated herein by reference.

The U.S. Pat. No. 4,901,307 patent discloses a multiple access communication system technique in which a large number of generally mobile or remote system users each employ a transceiver to communicate with other system users or desired signal recipients, such as through a public telephone switching network. The transceivers communicate through satellite repeaters and gateways or terrestrial base stations (also sometimes referred to as cell-sites or cells) using code division multiple access (CDMA) spread spectrum type communication signals. Such systems allow the transfer of various types of data and voice communication signals between system users, and others connected to the communication system.

Communication systems using spread spectrum type signals and modulation techniques, such as disclosed in U.S. Pat. No. 4,901,307, provide increased system user capacity over other techniques because of the manner in which the full frequency spectrum is used concurrently among system users within a region, and 'reused' many times across different regions serviced by the system. The use of CDMA results in a higher efficiency in utilizing a given frequency spectrum than achieved using other multiple access techniques. In addition, the use of wide band CDMA techniques permits such problems as multipath fading to be more readily overcome, especially for terrestrial repeaters.

Pseudonoise (PN) modulation techniques used in wide band CDMA signal processing provide a relatively high signal gain which allows spectrally similar communication channels or signals to be more quickly differentiated. This allows signals traversing different propagation paths to be readily distinguished, provided any path length difference causes relative propagation delays in excess of the PN chip duration, that is, the inverse of the bandwidth. If a PN chip rate of say approximately 1 MHz is used, the full spread spectrum processing gain, equal to the ratio of the spread bandwidth to system data rate, can be employed to discriminate between signal paths differing by more than one microsecond in path delay or time of arrival. This differential corresponds to a path length differential of approximately 1,000 feet. A typical urban environment provides differential path delays in excess of one microsecond, and some areas upwards of 10–20 microseconds in delay.

The ability to discriminate between multipath signals greatly reduces the severity of multipath fading, although it does not typically totally eliminate it because of occasional paths with delay differentials of less than a PN chip period. The existence of low delay paths is more especially true for satellite repeaters or directed communication links where multipath reflections from buildings and other terrestrial surfaces is greatly reduced. Therefore, it is desirable to provide some form of signal diversity as one approach to reducing the deleterious effects of fading and additional problems associated with relative user, or repeater, movement.

Generally, three types of diversity are produced or used in spread spectrum type communication systems, and they are time, frequency, and space diversity. Time diversity is obtainable using data repetition, time interleaving of data or signal components, and error coding. A form of frequency diversity is inherently provided by CDMA in which the signal energy is spread over a wide bandwidth. Therefore, frequency selective fading affects only a small part of the CDMA signal bandwidth.

Space or path diversity is obtained by providing multiple signal paths through simultaneous links with a mobile user through two or more base stations, for terrestrial-based repeater systems; or two or more satellite beams or individual satellites, for space-based repeater systems. That is, in the satellite communication environment or for indoor wireless communication systems, path diversity may be obtained by deliberately transmitting or receiving using multiple antennas. Furthermore, path diversity may be obtained by exploiting a natural multipath environment by allowing a signal arriving over different paths, each with a different propagation delay, to be received and processed separately for each path.

If two or more signal reception paths are available with sufficient delay differential, say greater than one microsecond, two or more receivers may be employed to separately receive these signals. Since these signals typically exhibit independent fading and other propagation characteristics, the signals can be separately processed by the receivers and the outputs combined with a diversity combiner to provide the final output information or data, and overcome problems otherwise existent in a single path. Therefore, a loss in performance only occurs when the signals arriving at both receivers experience fading or interference in the same manner and at the same time. In order to exploit the existence of multipath signals, it is necessary to utilize a waveform that permits path diversity combining operations to be performed.

Examples of using path diversity in multiple access communication systems are illustrated in U.S. Pat. No.

5,101,501 entitled "SOFT HANDOFF IN A CDMA CELLULAR TELEPHONE SYSTEM," issued Mar. 31, 1992, and U.S. Pat. No. 5,109,390 entitled "DIVERSITY RECEIVER IN A CDMA CELLULAR TELEPHONE SYSTEM," issued Apr. 28, 1992, both assigned to the assignee of the present invention, and incorporated herein by reference.

The CDMA techniques disclosed in U.S. Pat. No. 4,901,307 contemplate the use of coherent modulation and demodulation for both communication directions or links in user-satellite communications. In communication systems using this approach, a pilot carrier signal is used as a coherent phase reference for gateway- or satellite-to-user and base station-to-user links. The phase information obtained from tracking the pilot signal carrier is then used as a carrier phase reference for coherent demodulation of other system or user information signals. This technique allows many user signal carriers to share a common pilot signal as a phase reference, providing for a less costly and more efficient tracking mechanism. In satellite repeater systems, the return link generally does not require a pilot signal for phase reference for gateway receivers. In a terrestrial wireless or cellular environment, the severity of multipath fading and resulting phase disruption of the communication channel, generally precludes use of coherent demodulation techniques for the user-to-base station link, where a pilot signal is not typically used. However, the present invention allows the use of both noncoherent modulation and demodulation techniques as desired.

While terrestrial based repeaters and base stations have been predominantly employed, future systems will place more heavy emphasis on the use of satellite based repeaters for broader geographic coverage to reach a larger number of 'remote' users and to achieve truly 'global' communication service. Unfortunately, in the satellite environment, several factors sometimes have a negative impact on the usefulness of traditional signal diversity and frequency and phase tracking techniques.

Satellite repeaters operate in a severely power limited environment. That is, there is a reasonably limited amount of power that the satellite control and communication systems can practically have access to. This is based on factors such as satellite size, and energy storage mechanisms, among others. It is extremely desirable to reduce the amount of power required or being used by the communication system for anything other than actual data transfer for a system user or subscriber.

It is also possible that the system is servicing a relatively low number of actual users at any time, operating well below capacity. This circumstance could lead to a pilot signal that accounts for more than fifty percent of the power being used by the satellite portion of the communication system, resulting in a potentially unacceptable inefficiency in power use for satellite repeaters. In this latter situation, the pilot signal becomes too 'expensive' to maintain, and pilot signal power could actually be decreased by system operators to compensate.

However, regardless of the reason for implementation, reducing power for pilot signals reduces the ability to initially acquire the pilot signal at high speed and provide for very accurate tracking of the pilot carrier phase. This is especially true in satellite systems where Doppler and other effects increase the difficulty in tracking the pilot carrier accurately, as compared to terrestrial based repeater systems. It can readily be seen that if the power is not high enough, or if Doppler and other effects are large enough factors, system users may not be able to reliably obtain a desired level of tracking for the pilot signal and must use a non-coherent demodulation scheme. That is, energy allocated to the pilot is insufficient to accurately estimate, to some specified level, the phase of the signals for coherent demodulation, or maintain tracking. At the same time, pilot energy received at the Earth's surface may be low adjacent to the edges of some satellite beam spots due to antenna signal shaping and such.

Therefore, it is desirable to provide a method of acquiring or demodulating a spread spectrum communications signal using non-coherent demodulation techniques. It is desirable for such techniques to operate effectively for system users or subscribers in the presence of decreased pilot signal energy. This should apply even when the pilot energy has decreased to such a low energy level, either by design or because of propagation effects, as to be non-detectable for practical purposes. At the same time, this technique should not interfere with the effective use of pilot signal information when it is available, and should be highly compatible with other pilot signal and CDMA communication system protocols.

SUMMARY OF THE INVENTION

In view of the above and other problems found in the art relative to pilot channel signals and signal demodulation in multiple access communication systems, one purpose of the present invention is to increase the energy available for system subscribers to use to estimate and track the phase of communication signals.

One advantage of the present invention is that it improves reception while remaining compatible with other modulation schemes.

Another advantage of the invention is that it supports both diversity and soft hand-off transfer between two communication links where one is using non-coherent modulation and the other coherent modulation.

A second purpose of the invention is to provide a modulation technique that preserves orthogonality between communication channels using non-coherent modulation/demodulation.

These and other purposes, objects, and advantages are realized in a method and apparatus for generating orthogonally encoded communication signals for system subscribers using multiple orthogonal functions or code sequences for each signal recipient or orthogonal communication channel. Digital data symbols to be transferred to intended users or subscriber units on a forward communication link within a spread spectrum type communication system are M-ary modulated using at least two n-length orthogonal modulation symbols, which each generally comprise one or more Walsh functions. The relationship between the orthogonal functions used and the M-ary level of modulation implemented is such that M equals the product of the total number of orthogonal functions used in generating modulation symbols and the number of functions used to generate each individual symbol. In other words, the total number of functions used and a factor (L) by which the length of each modulation symbol exceeds the length n of each function. Generally, the number of functions and factor are chosen so that M is less than 64. The functions used to generate the modulation symbols represent functions normally assigned or used within the communication system.

Under this approach, 2 orthogonal functions of length n can be used to generate two n-length modulation symbols and obtain 2-ary modulation, while the same orthogonal functions can also be used to generate four 2n-length modulation symbols which are used to obtain 4-ary modulation. In a further aspect of the invention, 4 orthogonal functions of length n are used to generate sixteen 4n-length modulation symbols which are used to obtain 16-ary modulation (M=4 [functions]×4 [n]=16).

The modulation is accomplished by mapping encoded and interleaved data symbols into modulation symbols, or code sequences, according to binary values of the data symbols being modulated. Each group of $\log_2 M$ data symbols, are used to generate or select corresponding M-ary output modulation symbols. Therefore, when L is equal to one and the number of n-length orthogonal functions used is 2, M is 2, and each (one) encoded data symbol is mapped onto one of two modulation symbols of length n. Typically, this is done by selecting one modulation symbol for a binary input value of '0' and another for '1'. In further embodiments, when L is equal to two and the number of functions used is 2, M is 4, and every two encoded data symbols are mapped onto four modulation symbols of length 2n. Likewise, when L is equal to four and the number of functions used is 4, M is 16, and every four encoded data symbols are mapped onto sixteen modulation symbols.

Generally, the modulation symbols are created by first generating n-length orthogonal codes, such as Walsh functions, in a series of N code generators. The value of N is at least $\log_2 M$ with the minimum being two, while M is generally less than 64. A modulation symbol selection means or device receives or generates the orthogonal codes and produces desired modulation symbols by either using individual code sequences, as in the case of lower order 2-ary modulation, or combining L individual code sequences, and inverses thereof, to create longer Ln-length modulation symbols, as desired. Code generators can be configured to also provide inverted sequences, or additional code generators can be employed for this function. In the alternative, the selection means can invert each selected sequence as desired to produce sequences used in formulating Ln-length modulation symbols. For higher order modulation, each Ln-length modulation symbol comprises either L code sequences, or L/2 sequences and L/2 inversions of the same sequence or function. The inverted functions are positioned within the overall modulation symbol sequence so that orthogonality is maintained between other sequences using that function.

The modulation symbol output for transmission is generated in response to the binary value of the input data code symbols. The selection means responds to the binary value of each $\log_2 M$ group of data symbols and provides the appropriate modulation symbol as an output.

In one embodiment of the invention, at least one, but typically two, orthogonal function generator is used to provide first and second n-length orthogonal functions. A selector or selection means is connected to receive user data symbols and the first and second functions, and responds to binary values of the data symbols by outputting the first orthogonal function when the symbols have one value and the second orthogonal function when data symbols have a second value. In the alternative, the selector. In an alternative embodiment, using higher level modulation, the selector responds by outputting a first, second, third and fourth 2n-length code sequences, using the first orthogonal function twice when a pair of data symbols in have a first value, using the first orthogonal function and its inverse when a pair of data symbols have a second value, using the second orthogonal function twice when a pair of data symbols have a third value, and using the second orthogonal function and its inverse when a pair of data symbols have a fourth value.

In another embodiment, at least one, but generally four, orthogonal function generators are used to provide first, second, third and fourth n-length orthogonal functions. A selector receives the user data symbols and the four functions, and responds to binary values of the data symbols by outputting four sequences in which the first, second, third, and fourth functions are repeated four times, respectively, each in response to one of four values for the data symbols. In addition, the selector outputs three sets of sequences each in response to one of twelve other values for the data symbols, in which the first, second, third, and fourth functions are repeated two times, respectively, and accompanied by two inversions of the repeated functions, with the relative position of the inversions in each sequence in each of said sets being shifted from inversions in other sequences so as to maintain substantial orthogonality.

Another embodiment of the invention uses a fast Hadamard transformation mechanism in the modulation process for a gateway or base station transmitter. Data symbols are input to a fast Hadamard transformation device, where they are mapped into the desired modulation symbols. The mapped output is converted to a serial data stream and band pass filtered to remove unwanted frequency components and then subjected to conventional analog signal processing for transmission.

The communication signals are demodulated by receiving spread spectrum communication signals having a common carrier frequency which are modulated using M mutually orthogonal Ln-length modulation symbols composed from a preselected number of n-length orthogonal functions and respective inverses thereof, where M is the product of L and the preselected number. The signals are then correlated with the preselected number of n-length orthogonal functions, in parallel, and demodulated into M energy values representing each of the M mutually orthogonal modulation symbols respectively. These energy values are then mapped into energy metric data using a dual maximum metric generation process.

The correlation and demodulation steps can be accomplished by inputting signals into at least two sets of N correlators, where N is the number of functions used, and then applying correlated signals to corresponding demodulators for each set of correlators. The signals are demodulated into M energy values in each demodulator representing each of the M mutually orthogonal modulation symbols. The resulting M energy values from each demodulator are combined into a single set of M energy values using an energy combiner.

In further aspects of the invention, the communication signals are also input into at least one coherent demodulator, and demodulated to produce at least one amplitude value. Resulting amplitude values from each coherent demodulator are combined into a single amplitude value in an amplitude combiner, and then combined with the output of the dual maximum metric generation process into composite metric values for data symbols in an energy combiner.

The invention typically finds application in a wireless telephone/data communication system in which remote users are located within a plurality of cells and receive signals from at least one gateway, using code division multiple access (CDMA) spread spectrum type communication signals. Modulated communication signals are transferred from the gateway to users using at least one satellite based repeater.

BRIEF DESCRIPTION OF THE DRAWINGS

The features, objects, and advantages of the present invention will become more apparent from the detailed description set forth below when taken in conjunction with the drawings in which like reference characters identify like elements throughout and wherein:

FIG. 9 illustrates a block diagram of a multiple finger receiver implementing both coherent and non-coherent demodulation.

DETAILED DESCRIPTION OF PREFERRED EMBODIMENTS

The present invention improves the ability of spread spectrum multiple access communication system subscribers to synchronize to the phase of carrier signals and to track frequency and code frames. A new modulation technique is employed that makes more efficient use of signal energy by using multiple orthogonal codes to encode symbol data in generating a user channel signal. This modulation approach provides for reception of more effective energy per symbol for each subscriber, which is used in formulating symbol energy metrics. This additional energy allows more accurate tracking in the absence of pilot signals. This approach also allows the use of both coherent and non-coherent signal demodulation techniques. The corresponding demodulation in the presence of a very weak, or non-existent, pilot signal, compensates for some problems that exist in many satellite based and other spread spectrum communication system designs.

In a typical CDMA communication system, such as a wireless data or telephone system, base stations within predefined geographical regions, or cells, each use several modulator-demodulator units or spread spectrum modems to process communication signals for system users. Each spread spectrum modem generally employs a digital spread spectrum transmission modulator, at least one digital spread spectrum data receiver and at least one searcher receiver. During typical operations, a modem in the base station is assigned to each remote or mobile user or subscriber unit as needed to accommodate transfer of communication signals with the assigned subscriber. If the modem employs multiple receivers, then one modem accommodates diversity processing, otherwise multiple modems may be used in combination. For communication systems employing satellite repeaters, these modems are generally placed in base stations referred to as gateways or hubs that communicate with users by transferring signals through the satellites. There may be other associated control centers that communicate with the satellites or the gateways to maintain system wide traffic control and signal synchronization.

Figure 1:
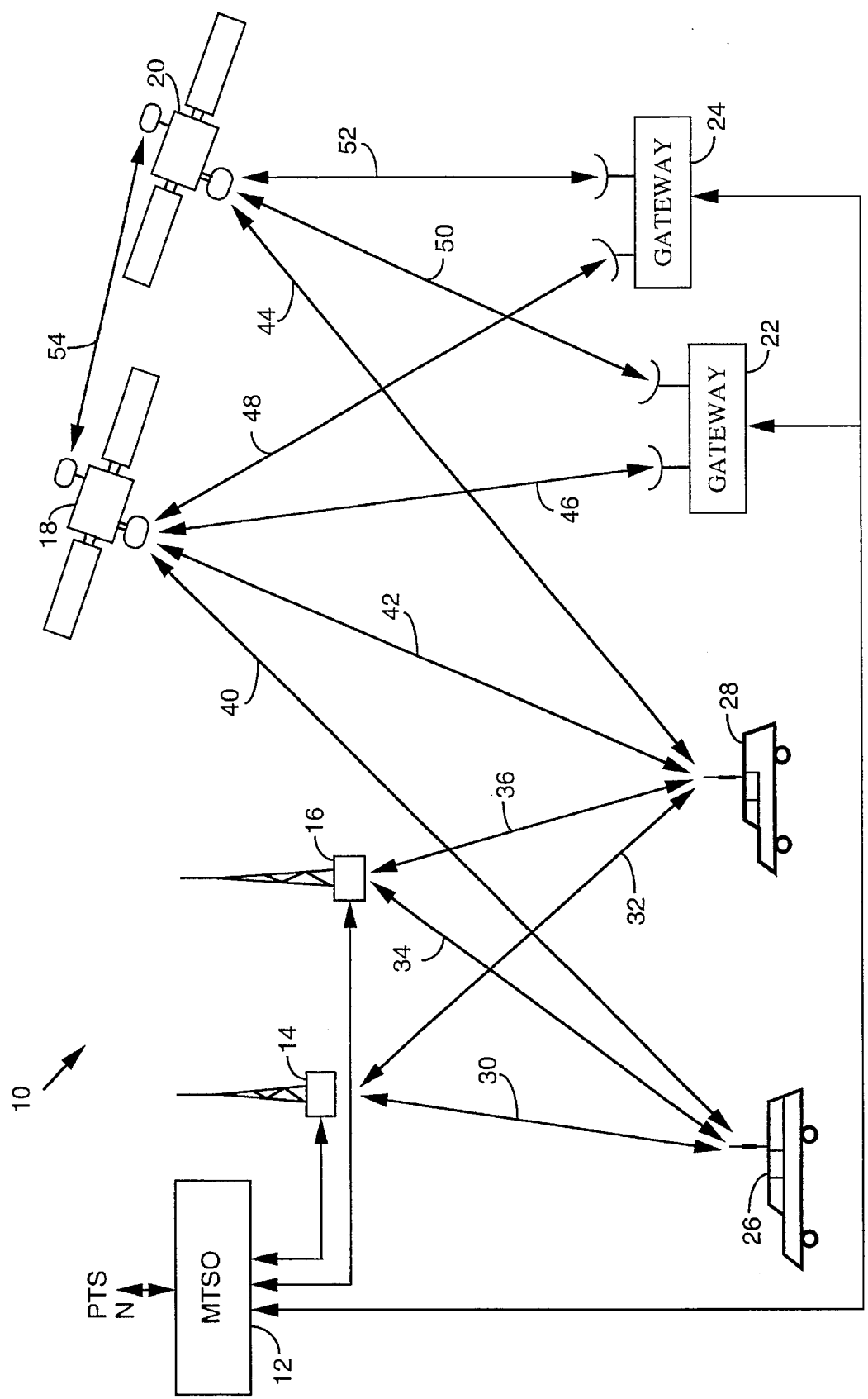
FIG. 1 illustrates a schematic overview of an exemplary CDMA wireless communication system.

An exemplary wireless communication system constructed and operating according to the principles of the present invention, is illustrated in FIG. 1. A communication system 10 illustrated in FIG. 1 utilizes spread spectrum modulation techniques in communicating between communication system remote or mobile subscriber units having wireless data terminals or telephones, and system base stations. Many such base stations may be used in large metropolitan areas to provide service for mobile users in cellular telephone type systems. Fewer satellite repeaters are typically used in a communication system to service more users per repeater but distributed over larger geographical regions.

As seen in FIG. 1, communication system 10 uses a system controller and switch network 12, also referred to as mobile telephone switching office (MTSO), which typically includes interface and processing circuitry for providing system-wide control for base stations or gateways. Controller 12 also controls the routing of telephone calls from a public switched telephone network (PSTN) to an appropriate base station or gateway for transmission to a desired, or designated, subscriber unit, as well as the routing of calls received from subscriber units through one or more base stations to the PSTN. Controller 12 generally places subscriber units in communication with each other by connecting calls between users through appropriate base stations and PSTN's, since the subscriber units in most communication systems are typically not configured, as a matter of efficiency and cost, to communicate directly with one another. The communication link that couples controller 12 to the various system base stations can be established using various known techniques such as, but not limited to, dedicated telephone lines, optical fiber links, or microwave or dedicated satellite communication links.

In the portion of the communication system illustrated in FIG. 1, two exemplary base stations 14 and 16 are shown for terrestrial repeater communications, along with two satellite repeaters 18 and 20, and two associated gateways or hubs 22 and 24. These elements of the system are used to effect communications with two exemplary remote subscriber units 26 and 28, which each have a wireless communication device such as, but not limited to, a cellular telephone. While these subscriber units are discussed as being mobile, it is also understood that the teachings of the invention are applicable to fixed units where remote wireless service is desired. This latter type of service is particularly relevant to using satellite repeaters to establish communication links in many remote areas of the world.

The terms beams (spots) and cells, or sectors, are used interchangeably throughout since they may be referred to in this manner in the art and the geographic regions serviced are similar in nature differing in the physical characteristics of the type of repeater platform used and its location. Although, certain characteristics of the transmission paths and restraints on frequency and channel reuse differ between these platforms. A cell is defined by the effective 'reach' of base station signals, while a beam is a 'spot' covered by projecting satellite communication signals onto the Earth's surface. In addition, sectors generally cover different geographical regions within a cell, while satellite beams at different frequencies, sometimes referred to as FDMA signals, may cover a common geographical region.

The terms base station and gateway are also sometimes used interchangeably, with gateways being perceived in the art as specialized base stations that direct communications through satellite repeaters and have more 'housekeeping tasks,' with associated equipment, to perform to maintain such communication links through moving repeaters, while base stations use terrestrial antennas to direct communications within a surrounding geographical region. Central control centers will also typically have more functions to perform when interacting with gateways and moving satellites.

It is contemplated for this example that each of base stations 14 and 16 provide service over individual geographic regions or 'cells' serviced by transmission patterns from their respective antennas, while beams from satellites 18 and 20 are directed to cover other respective geographic regions. However, it is readily understood that the beam coverage or service areas for satellites and the antenna patterns for terrestrial repeaters may overlap completely or partially in a given region depending on the communication system design and the type of service being offered. Accordingly, at various points in the communication process handoffs may be made, as discussed below, between base stations or gateways servicing the various regions or cells, and diversity may also be achieved between any of these communication regions or devices.

The signal gain made possible by CDMA modulation techniques allows a 'soft' handoff scheme for use when subscribers change locations sufficiently to traverse into a region serviced by a new base station, gateway, or satellite beam pattern. In this approach, a new modem in a gateway is assigned to the subscriber unit while the existing gateway modem continues to service the communication link, until it is clear the old link should be terminated. When a subscriber unit is located in a transition region between the coverage of two base stations, that is, an area of overlapping coverage, the communication link may be maintained by two modems at once, one for each base station, or transferred between modems in accordance with received signal strength and frequency availability. Since the subscriber unit is always communicating through at least one modem, fewer disruptions in service occur. In this manner, a subscriber unit utilizes multiple gateway or base station modems for assisting in the handoff process, in addition to performing a diversity function. In addition, soft hand-off can be used substantially continuously to maintain communication links between subscribers and multiple satellites.

In FIG. 1, some of the possible signal paths for communication links between base station 14 and subscriber units 26 and 28 are illustrated by a series of lines 30 and 32, respectively. The arrowheads on these lines illustrate exemplary signal directions for the link, as being either a forward or a reverse link, although this serves as illustration only for purposes of clarity and does not represent any restrictions on actual signal patterns or required communication paths. In a similar manner, possible communication links between base station 16 and subscriber units 26 and 28, are illustrated by lines 34 and 36, respectively. Base stations 14 and 16 typically are configured to transmit signals using equal power to minimize mutual interference between users.

Additional possible signal paths are illustrated for communications being established through satellites 18 and 20. These communication links establish signal pathways between one or more gateways or centralized hubs 22 and 24, and subscriber units 26 and 28. The satellite-user portions of these communication links are illustrated by a series of lines 40, 42, and 44, and the gateway-satellite portions by lines 46, 48, 50, and 52. In some configurations it is also possible to establish direct satellite-to-satellite communications such as over a link indicated by lines 54.

The geographic areas or cells serviced by the base stations are designed in substantially non-overlapping or non-intersecting shapes that normally place a user or subscriber unit closer to one base station than another, or within one cell sector where the cell is further sub-divided. This is also substantially the same for satellite communications, although the determinative factor here is the presence of a subscriber unit in a particular beam pattern, and its signal strength, but not relative closeness to a satellite.

In current CDMA wireless or cellular telephone systems, each base station or gateway also transmits a 'pilot carrier' signal throughout its region of coverage. For satellite systems, this signal is transferred within each satellite 'beam' or beam portion and originates with specific gateways being serviced by the satellite. A single pilot is transmitted for each gateway or base station and shared by all users of that gateway, except in the case of regions sub-divided into sectors where each sector might have its own distinct pilot signal. The pilot signal generally contains no data modulation and is used by subscriber units to obtain initial system synchronization and to provide robust time, frequency and phase tracking of the base station transmitted signals. Each gateway or base station also transmits spread spectrum modulated information, such as gateway identification, system timing, user paging information, on various other signals.

While each base-station or gateway has a unique pilot signal (subject to system wide re-use), they are not generated using different PN code generators, but use the same spreading code at different code phase offsets. This allows PN codes that can be readily distinguished from each other, in turn distinguishing originating base stations and gateways, or cells and beams. In the alternative, a series of PN codes are used within the communication system with different PN codes being used for each gateway, and possibly for each satellite plane through which gateways communicate. It will be readily apparent to those skilled in the art that as many or as few PN code as desired can be assigned to identify specific signal sources or repeaters in the communication system. That is, codes can be employed to differentiate each repeater or signal originator within the system as desired, subject to the total number of possible communication channels and a desired to maximize the number of users addressable within the system.

Using one pilot signal code sequence throughout a communication system allows subscriber units to find system timing synchronization with a single search over all pilot signal code phases. The strongest pilot signal is readily detectable using a correlation process for each code phase. A subscriber unit sequentially searches the whole sequence and tunes to the offset or shift that produces the strongest correlation. The strongest pilot signal identified by this process generally corresponds to the pilot signal transmitted by the nearest base station or covering satellite beam. However, the strongest pilot signal is generally used regardless of its transmission source, because it is clearly a signal the user can readily track and demodulate accurately.

The generally higher power level and, therefore, greater signal-to-noise ratio and interference margin of the pilot signal enables high speed initial acquisition, and allows very accurate tracking of its phase using a relatively wide bandwidth phase tracking circuit. The carrier phase obtained from tracking the pilot carrier is used as a carrier phase reference for demodulating user information signals transmitted by bases stations 14 and 16 and gateways 22 and 24. This technique allows many traffic channels or user signal carriers to share a common pilot signal for carrier phase reference.

Upon acquiring or synchronizing with the strongest pilot signal, the subscriber unit then searches for another signal, referred to as the sync or synchronization signal or channel which typically uses a different cover code, as discussed below, having the same sequence length as the pilot. The synchronization signal transmits a message containing certain system information which further identifies the originating gateway and overall communication system, in addition to conveying certain synchronizing information for the long PN codes, interleaver frames, vocoders, and other system timing information used by a remote subscriber unit without requiring additional channel searching.

Another signal, referred to as the paging signal or channel, may also be used by the communication system to transmit messages indicating that a call or communication information has 'arrived' or is present or is being 'held' for a subscriber at a gateway. One or more channels may be reserved for this function and subscriber units can monitor these channels and the pilot, to the exclusion of others, while in an inactive mode, that is, when no communication link is established. The paging signal typically provides appropriate channel assignments for use when a user initiates a communication link, and requests a response from the designated subscriber unit.

As illustrated in FIG. 1, pilot signals are transmitted to subscriber unit 26 from base stations 14 and 16 using outbound or forward communication links 30 and 36, respectively, and from gateways 22 and 24, through satellite 18 using links 40, 46, and 48. Circuitry in subscriber unit 26 is then used to make a determination which base station or gateway (satellite) services it should use for communication, that is, generally which cell or beam it is in, by comparing relative signal strengths for the pilot signals transmitted by base stations 14 and 16 or gateways 22 and 24. For purposes of clarity in illustration, in FIG. 1 satellite 20 is not shown as communicating with subscriber unit 26, although this may certainly be possible depending on the specific system configuration, satellite beam pattern distribution, and transfer of calls by MTSO 12.

In this example, subscriber unit 28 may be considered as being closest to base station 16 for terrestrial service purposes but within the coverage of satellites 18 or 20 for gateway service purposes. When subscriber unit 28 initiates a call, a control message is transmitted to the nearest base station or satellite gateway, here 16, or 18 and 20. Base station 16 upon receiving the call request message, transfers the called number to system controller or MTSO 12. System controller 12 then connects the call through the PSTN to the intended recipient. In the alternative, the communication link from subscriber unit 28 is established through satellite 18 with gateway 22 or 24. Gateway 22 receives the call request message and transfers it to system controller 12 which processes it as before.

Whether a call or message link request originates within the PSTN or is initiated by a subscriber unit, MTSO 12 generally transmits call information to all base stations or gateways in a predefined area where the unit is either known to be, such as based on previous message information, or predicted to be, such as in a 'home' region. The gateways and base stations in turn transmit a paging message within each of their respective coverage areas for the called subscriber. When the intended recipient's unit detects the page message, it responds by transmitting a control message to the nearest base station or through the appropriate satellite to a gateway. This control message signals system controller 12 which particular gateway, satellite, or base station is in communication with the subscriber unit and MTSO or controller 12 then routes messages or calls through that link to the subscriber unit. Should the subscriber unit, here 28, move out of the coverage area of the initially chosen satellite, 18, or gateway, 22 or 24, an attempt is made to continue the communication link by routing information through other satellites until either a different gateway or a base station must be used.

When a call or communication link is initiated and a subscriber or remote unit changes to an active mode, a pseudonoise (PN) code is generated or selected for use during the length of this call. The code may be either dynamically assigned by the gateway or determined using prearranged values based on an identity factor for the particular subscriber unit. After a call is initiated, the subscriber unit continues to scan both the pilot signal for the gateway through which it is communicating and pilot signals for neighboring beams or cells. The pilot signal scanning continues in order to determine if a neighboring pilot signal strength exceeds that of the one initially selected. When the signal strength of the pilot signal associated with a neighboring cell or beam exceeds that of the current cell or beam, the subscriber unit determines that a new cell or beam pattern has been entered, and a handoff of communication to the gateway for that pattern should be initiated.

Figure 2:
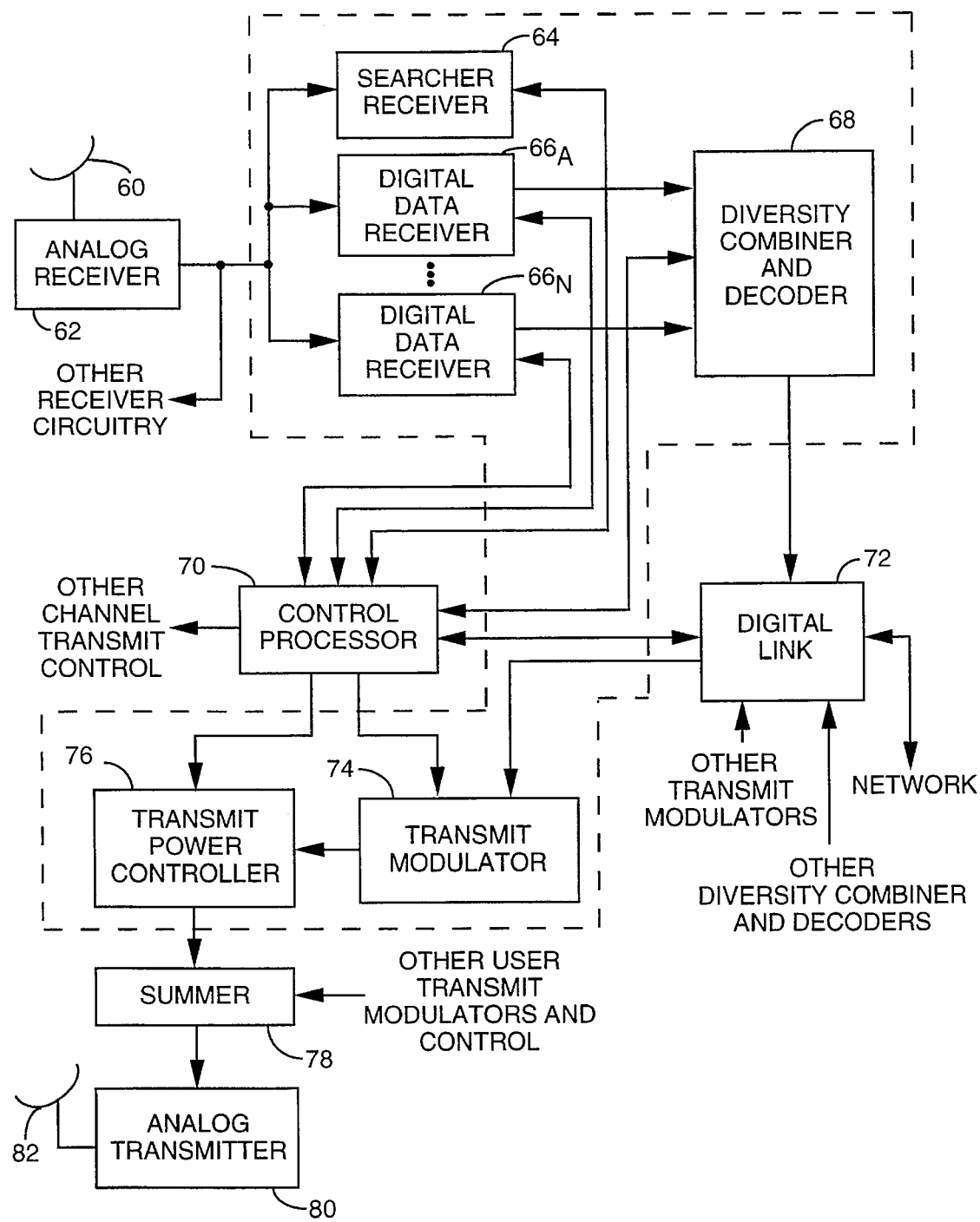
FIG. 2 illustrates a block diagram of exemplary gateway demodulation/modulation and transmission apparatus for a wireless CDMA communication system.

An exemplary embodiment of a transceiver portion of base station or gateway apparatus useful for implementing a CDMA communication system is illustrated in further detail FIG. 2. In FIG. 2, one or more receiver sections are utilized which are each coupled to an antenna and analog receiver section for effecting frequency or space diversity reception. In terrestrial repeater base stations, multiple antennas are used to achieve space diversity reception, generally within sectors. In gateways, multiple antennas may be used to also accommodate several different satellites and orbital patterns.

Within each of the receiver sections, the signals are processed in a substantially identical manner until the signals undergo a diversity combination process. The elements within the dashed lines in FIG. 2 correspond to receiver elements used to manage communications between one gateway and one mobile subscriber unit, although certain variations are known in the art. The output of the analog receivers or receiver sections are also provided to other elements to be used in communications with other subscriber units, also discussed further in U.S. Pat. No. 5,103,459 referenced below.

The transceiver illustrated in FIG. 2 uses an analog receiver 62 connected to an antenna 60 for receiving, downconverting, amplifying, and digitizing communication signals. Various schemes for RF-to-IF-to-Baseband frequency downconversion and analog-to-digital conversion for channel signals are well known in the art. The digitized signals are then transferred to a searcher receiver 64 and at least one digital data demodulator $66_A$. Additional digital data receivers $66_B$–$66_N$ are used to obtain signal diversity for each subscriber unit, as desired, with each forming one finger in a Rake type signal receiver. These additional data receivers, alone or in combination with other receivers, track and receive subscriber signals along several possible propagation paths and provide diversity mode processing. Each of the data receivers are generally substantially identical in structure and function, but may operate with slightly different timing due to the nature of the diversity signals. As previously stated, a gateway generally has one or more additional receiver sections, not shown, each assigned to accommodate an active subscriber.

At least one gateway control processor or controller 70 coupled to demodulators $66_A$–$66_N$ and searcher receiver 64, provides command and control signals to effect functions such as, but not limited to, signal processing, timing signal generation, power and handoff control, diversity, diversity combining, and system interfacing with the MTSO. Another main control task for control processor 70, is Walsh function, transmitter, and demodulator assignments for subscriber communications. The searcher receivers are typically used to determine which demodulators are to be assigned to the analog outputs. Each demodulator is then responsible to track the timing of the signals it is receiving using known techniques.

The outputs of data demodulators $66_A$–$66_N$ are coupled to one or more diversity combiner and decoders 68 which serve to logically combine the signals output by demodulators servicing a common subscriber unit. This combined signal is provided to a digital data link 72, which is also coupled to control processor 70, a transmit modulator 74, and typically to a MTSO digital switch or network. The circuitry used to construct digital link 72 is well known and typically involves various known digital data switching and storage components. Digital data link 72 serves to control or direct the transfer of decoded/encoded signals among diversity combiner and decoders 68, the MTSO network, and one or more gateway transmit modulators 74, all under the control of control processor 70.

Digitized signals output from demodulators 66 and searcher receiver 64, in this example, consist of combined I and Q channel signals. However, those skilled in the art will readily appreciate that these elements can be constructed to provide internal channel splitting prior to digitizing the I and Q channels, rather than splitting the digitized I and Q channel signals after conversion. This splitting simply alters the nature of the data busses used to transfer data to other elements.

On the transmission side, signals from the MTSO, within the communication system, or from other combiners, are coupled to an appropriate transmit modulator for transmission to a recipient subscriber using digital link 72. Transmit modulator 74, also operating under the control of control processor 70, spread spectrum modulates data for transmission to an intended recipient and provides the resulting signal to a transmit power controller 76 which provides control over the transmission power used for the outgoing signal. Further details with respect to the structure and operation of exemplary transmit modulators 72 are discussed in U.S. Pat. Nos. 5,103,459 and 5,309,474, both referenced below, which are assigned to the assignee of the present invention and incorporated herein by reference.

The output of power controller 76 is summed with the output of other transmit modulator/power control circuits preparing signals for the same carrier signal, in a summer 78. The output of summer 78 is in turn provided to an analog transmitter 80 for further amplification at the desired frequency and output to antenna 82 for radiating to subscriber units through satellite repeaters. Control processor 70 also controls the generation and power of the pilot, sync channel, and paging channel signals and their coupling to power controller 76 before being summed with the other signals and output to antenna 82.

Spread spectrum type communication systems, such as the example illustrated in FIG. 1, use a waveform based on a direct sequence pseudonoise spread spectrum carrier. That is, a baseband carrier is modulated using a pseudonoise PN sequence, of period $T_s$, to achieve the desired spreading effect. The PN sequence consists of a series of 'chips', of period $T_c$, which have a frequency much higher than the baseband communication signal being spread, which is typically only around 9.6 to 19.2 kbps. A typical chip rate is on the order of 1.2288 MHz and is chosen according to total bandwidth, desired or allowable signal interference, and other criteria relating to signal strength and quality which are known in the art. Therefore, those skilled in the art will appreciate how the chip rate can be modified according to the allocated spectrum, and in view of cost constraints and communication quality trade-offs.

The pilot sequence must be long enough that many different sequences can be generated using the phase offsets to support a large number of pilot signals in the system. In an exemplary embodiment, the sequence length for the transmitted signal carrier is chosen to be $2^{15}$ or 32768 chips. The resulting sequence has good cross-correlation and auto-correlation properties which are necessary to prevent mutual interference between pilot signals transmitted by different cells. At the same time, it is desirable to maintain the sequence as short as possible to minimize acquisition time. With unknown timing, the entire length of the sequence must be searched to determine the correct timing. The longer the sequence, then the longer this sequence search time. However, as sequence length is reduced, code processing gain is also reduced along with interference rejection, perhaps to unacceptable levels.

As indicated earlier, signals from different gateways or base stations are differentiated by providing different time offsets of the basic pilot code sequences for each region relative to its neighbors. The offsets or shifts must be great enough to ensure substantially no interference between pilot signals.

In the base station- or gateway-to-subscriber link, the binary sequences used for spreading the spectrum are constructed from two different types of sequences, each having different properties and serving a different function. An 'outer' code is used to discriminate between signals transmitted by different base stations and between multipath signals. This outer code is typically shared by all signals in a cell, or beam, and is generally a relatively short PN sequence. However, depending on system configuration, a set of PN code sequences could be assigned to each gateway or different PN codes could be used by the satellite repeaters. Each system design specifies the distribution of orthogonal 'outer' codes within the system according to factors understood in the art.

An 'inner' code is then used to discriminate between the different users within a region or between user signals transmitted by a single base station, gateway, or satellite beam on the forward link. That is, each subscriber unit has its own orthogonal channel provided on the forward link by using a unique covering PN code sequence. On the reverse link, the user signals are not completely orthogonal but are differentiated by the manner in which they are code symbol modulated. It is also understood in the art that additional spreading codes can be used in preparing data for transmission such as to provide an additional level of 'scrambling' to improve the signal gain during subsequent reception and processing.

It is well known in the art that a set of n orthogonal binary sequences of length n, for n being a power of 2, can be constructed. This is discussed in the literature, such as in Digital Communications with Space Applications, S. W. Golomb et al., Prentice-Hall, Inc., 1964, pp. 45–64. In fact, sets of orthogonal binary sequences are also known for most sequences having lengths which are multiples of four but less than two hundred. One class of such sequences that is relatively easy to generate is called the Walsh function, also known as Hadamard matrices.

A Walsh function matrix of order n over the real field can be defined recursively as:

$$W(n) = \begin{vmatrix} W(n/2) & W(n/2) \\ W(n/2) & \overline{W}(n/2) \end{vmatrix}$$

where $\overline{W}$ denotes the logical complement of W, that is, $\overline{W}(n) = -W(n)$ and $W(1)=1$.

Therefore the first few Walsh functions or orders 2, 4, and 8 can be represented as:

$$W(2) = \begin{vmatrix} 1 & 1 \\ 1 & -1 \end{vmatrix},$$

$$W(4) = \begin{vmatrix} 1 & 1 & 1 & 1 \\ 1 & -1 & 1 & -1 \\ 1 & 1 & -1 & -1 \\ 1 & -1 & -1 & 1 \end{vmatrix} \text{ and}$$

$$W(8) = \begin{vmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{vmatrix}$$

A Walsh function or sequence, then, is simply one of the rows of a Walsh function matrix, and a Walsh function of order 'n' contains n sequences $S_n(n)$, each being n bits in length. The individual bits forming a Wash code sequence are also referred to as Walsh chips. Therefore, Walsh function $W_i(n)$ is the $i^{th}$ row of an 'n-row/column' Walsh function matrix, and has n bits. For example, Walsh function $W_3(8)$ is shown above as the sequence $S_3(8)=1\ 1\text{-}1\text{-}1\ 1\ 1\text{-}1\text{-}1$.

A Walsh function of order n over the real field (as well as other orthogonal functions) has the property that over an interval of n chips in a string of chips, the cross-correlation between all of the different sequences $S_n(n)$ within the set is zero, provided the sequences are temporally aligned. This is easily understood by observing that exactly half of the bits, or chips, in every sequence differ from those in all other sequences. Another useful property is that one sequence (real) always consists of all ones while all of the other sequences consist of half ones and half minus ones. In the alternative, one sequence (complex) is all zeroes and the others half ones and half zeroes.

In current standards for spread spectrum communication systems, all subscribers or user units operating within a beam or cell share a single 'outer' PN code phase. That is, the basic timing and phase established by gateways and base stations for users on a given frequency, as generally imparted in pilot and sync signals, is the same. What distinguishes subscriber or user signals as unique to given recipients is the application of a distinct orthogonal spreading or scrambling function, Walsh functions, to each user's signal, also referred to as a subscriber channel. This is the use of the phase aligned outer PN codes versus the inner codes.

In a given spread spectrum communication system using Walsh functions or code sequences, a pre-defined set or table of sequences having n rows of n values each is established in advance to define the different code sequences. In current designs, this is typically configured as a pre-defined set of 64 Walsh functions, each having a 64 chip length. These functions are used to assure orthogonality for 64 channels or subscribers (minus pilot, paging, and sync) within a carrier signal used in a beam, cell, or sector. For advanced satellite based repeater systems to increase the number of users that can be provided with service, an increase in the size of the Walsh function to at least 128 chips in length (n=128) is contemplated.

In this manner, the chips or chip binary values ('0' or '1') for Walsh functions, such as $W_1(64)$, $W_2(64)$, or $W_{64}(64)$, are pre-defined and exist in an ordered set for use within the communication system. These functions are reusable across beams and cells because of the carrier signal phase offsets already implemented for each cell's or beam's basic tinting as evidenced by the pilot signal offsets (outer code). Use of this type of information is understood by those skilled in the art.

Several signal carrier waveforms can be used within communication system 10. In the preferred embodiment, a sinusoidal carrier signal is quadraphase (four phase) modulated by a pair of binary PN sequences. In this approach, the PN sequences are generated by two different PN generators having the same sequence length. One sequence bi-phase modulates an in-phase channel (I channel) of the carrier signal, and the other sequence bi-phase modulates a quadrature phase, or just quadrature, channel (Q channel) of the carrier signal. The resulting signals are summed to form a composite four-phase carrier signal.

Figure 3:
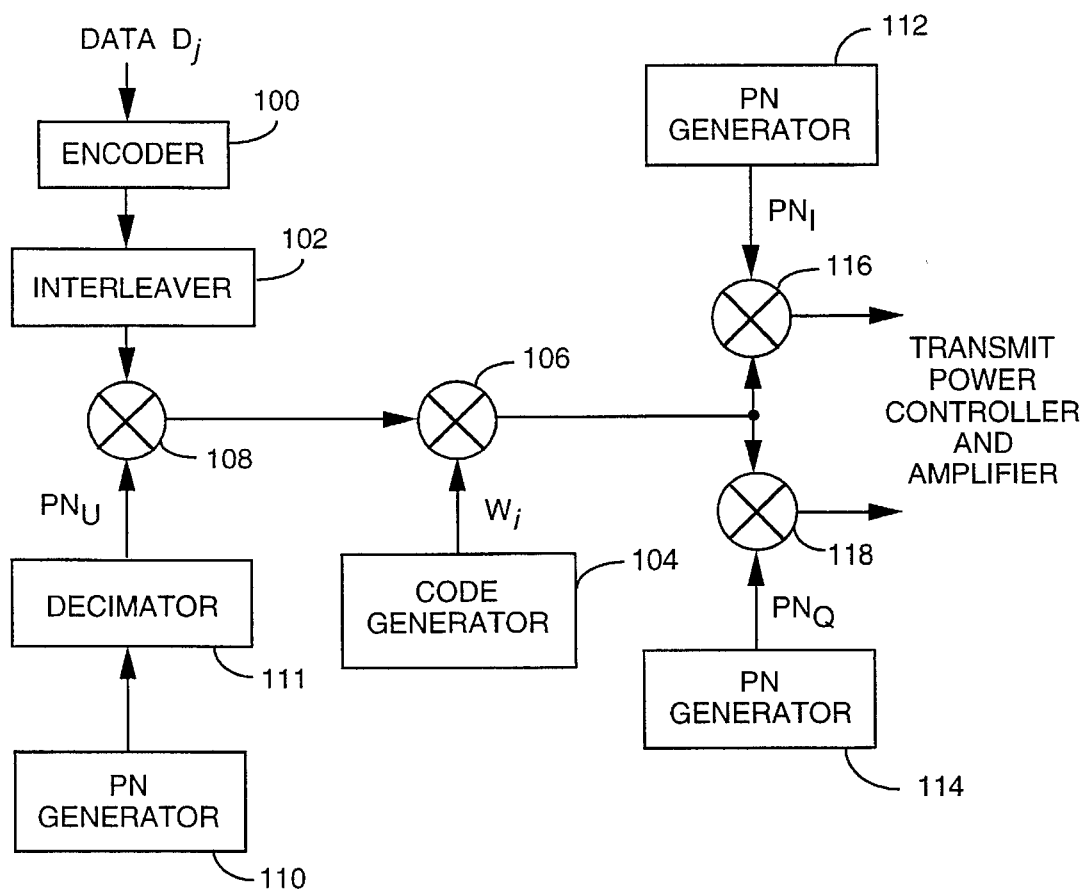
FIG. 3 illustrates an exemplary signal modulator for preparing and modulating data intended for a subscriber unit, useful in the apparatus of FIG. 2.

An exemplary signal modulator design for implementing transmission modulator 74 and preparing data $D_j$, intended for subscriber unit j, for transmission is illustrated in FIG. 3. As shown in FIG. 3, modulator 74 includes a data encoder 100 and an interleaver 102. Prior to application of orthogonal coding or spreading, here using Walsh functions, the digital data signals carried by each communication channel are generally encoded, with repetition, and interleaved in order to provide error detection and correction functions which allow the system to operate at lower signal-to-noise and interference ratios. This results in data symbols which are processed for transmission.

The underlying data represents voice or other types of analog signals originating on a PSTN, or with another subscriber unit, and being transferred through the MTSO. The data is processed according to typical or known analog techniques and previously amplified or filtered, then converted to digital signal form. Techniques used for the encoding, repetition, and interleaving steps are also well known in the art. Further discussion of interleaving, for example, is found in Data Communication, Networks and Systems, Howard W. Sams & Co., 1987, pp. 343–352.

The interleaved symbols from interleaver 102 are then orthogonally encoded or covered with an assigned orthogonal code sequence supplied by a code generator 104. The code from generator 104 is multiplied by or combined with the symbol data in a logic element 106. The orthogonal function is typically clocked in at a rate of 1.2288 MHz. At the same time, in exemplary variable data rate systems including voice, facsimile (FAX), and high/low-speed data channels, the information symbol rate may vary, for example, from approximately 75 Hz to 76,800 Hz. Before being covered by the Walsh code, the interleaved data may also be multiplied with a binary $PN_U$ sequence in a second logic element 108 connected in series with the input of multiplier 106. This sequence is provided by output of a long PN code generator 110, typically also clocked at 1.2288 MHz and then decimated in a decimator 111 to provide a 19,200 kbps rate. In the alternative, logic element 108 could be connected in series with the output of multiplier 106 with the resulting covered data from multiplier 106 being multiplied by the $PN_U$ sequence. When Walsh code and $PN_U$ sequences consist of binary '0' and '1' values instead of '−1' and '1', the multipliers can be replaced by logic elements such as exclusive-OR gates.

Code generator 110 generates a separate PN code sequence $PN_U$ corresponding to a unique PN sequence generated by or for each subscriber unit and can be constructed using a variety of known elements configured for this purpose. The $PN_U$ sequence scrambles the data to provide security or further signal diversity. In the alternative, a non-linear encryption generator, such as an encryptor using the data encryption standard (DES), may be utilized in place of PN generator 110 as desired. The $PN_U$ sequence can be either assigned only for the duration of a given communication message or link, or permanently to one subscriber unit.

The transmitter circuitry also includes two PN generators 112 and 114, which generate the two different short length, $PN_I$ and $PN_Q$ code sequences for the In-Phase (I) and Quadrature (Q) channels. All subscriber units use the same $PN_I$ and $PN_Q$ sequences but time shifted or offset by differing amounts, as discussed above. In the alternative, these generators could be time shared among several transmitters using appropriate interface elements. An exemplary generation circuit for these codes is disclosed in U.S. Pat. No. 5,228,054 entitled "POWER OF TWO LENGTH PSEUDO-NOISE SEQUENCE GENERATOR WITH FAST OFFSET ADJUSTMENTS," issued Jul. 13, 1993, and assigned to the assignee of the present invention.

These PN generators are responsive to an input signal corresponding to a beam or cell identification signal from the control processor so as to provide a predetermined time offset delay to the PN sequences. Although only two PN generators are illustrated for generating the $PN_I$ and $PN_Q$ sequences, it is readily understood that many other PN generator schemes, including additional generators, may also be implemented within the teachings of the invention.

The Walsh encoded symbol data output by multiplier 106 is multiplied by the $PN_I$ and $PN_Q$ code sequences such as by using a pair of multipliers 116 and 118. The resulting signals are then generally modulated onto an RF carrier, typically by bi-phase modulating a quadrature pair of sinusoids that are summed into a single communication signal, and summed with the pilot and setup carrier signals, along with the other data signals for a beam or cell. Summation may be accomplished at several different points in the processing such as at the IF or baseband frequencies, either before or after multiplication by the PN sequence associated with the channels within a particular beam or cell. The resulting signal is then bandpass filtered, translated to the final RF frequency, amplified, filtered and radiated by the antenna of the gateway. As was discussed earlier, the filtering, amplification, translation and modulation operations may be interchanged. Additional details of the operation of this type of transmission apparatus are found in U.S. Pat. No. 5,103,459, entitled "SYSTEM AND METHOD FOR GENERATING SIGNAL WAVEFORMS IN A CDMA CELLULAR TELEPHONE," assigned to the assignee of the present invention and incorporated herein by reference.

While the modulator design illustrated in FIG. 3 performs satisfactorily in most communication systems, it provides a very basic approach to signal modulation and encoding. Those skilled in the art utilize such a modulation design to achieve a simple and effective application of Walsh cover codes to provide inter-beam or inter-cell orthogonality as previously mentioned. However, the apparatus of FIG. 3 generally requires the use of a pilot signal and coherent demodulation by signal receivers. Without a pilot signal, the approach shown in FIG. 3 does not provide sufficient symbol energy to allow receivers to lock onto and track the phase of data signal frames in many applications.

On the other hand, applicant has discovered that multiple orthogonal code sequences can be used for modulating each data signal to obtain additional signal processing gain for non-coherent signal processing. Applicant has discovered that M code sequences (where $M=2^k L$ and k is an integer, and L is a factor discussed below) can be used to provide an M-ary modulation scheme referred to as M-ary Walsh shift keying, that increases the energy of the modulation symbols being received so that error performance approaches that of coherent demodulation techniques. Examples are shown below for lower order or modulation level values of M where M=2, 4, and 16. To maintain compatibility with the more conventional use of 'cover' codes, the value of k is set equal to 0 in the above notation (and L=1), resulting in a value for M of 1 and 1-ary or single code sequence modulation.

By taking advantage of the orthogonality properties discussed above for Walsh functions (or other orthogonal functions), multiple Walsh functions or code sequences $W_1$, $W_2$, ... $W_n$ can be used to generate M-ary orthogonal sequences or M orthogonal modulation symbols. For example, two n-length Walsh functions $W_i(n)$ and $W_j(n)$ can be used to generate binary or 2-ary orthogonal sequences $S_n$ with n Walsh chips, having the form:

$$S_1(n)=W_i(n)$$

(i≠j) and $$S_2(n)=W_j(n)$$

where i and j represent the specific rows of the pre-defined Walsh matrix. Every modulation symbol is a Walsh function of length n chips. For example, using the respective sequences from the above exemplary matrixes and setting n=8, i=3, and j=4, then the resulting sequences $S_1(8)$ and $S_2(8)$ are:

$$S_1(8)=1\ 1\text{-}1\text{-}1\ 1\ 1\text{-}1\text{-}1 \text{ and}$$

$$S_2(8)=1\text{-}1\text{-}1\ 1\ 1\ 1\text{-}1\text{-}1\ 1$$

Two sequences, such as these, are used to modulate the encoded data symbols according to a selective symbol mapping scheme. The symbols from the encoder and/or interleaver are mapped into two orthogonal modulation symbols created by a predetermined pair or subset of two distinct Walsh functions. This is accomplished by selecting an appropriate code sequence $S_1$ or $S_2$ in response to the state or binary value of the input symbols. That is, the binary value '0' selects one sequence, say $S_1$, and the binary value '1' selects the other sequence, here $S_2$. These sequences are then transferred to later signal processing stages as the modulated symbols for application of the $PN_I$ and $PN_Q$ spreading sequences, as before.

Figure 4:
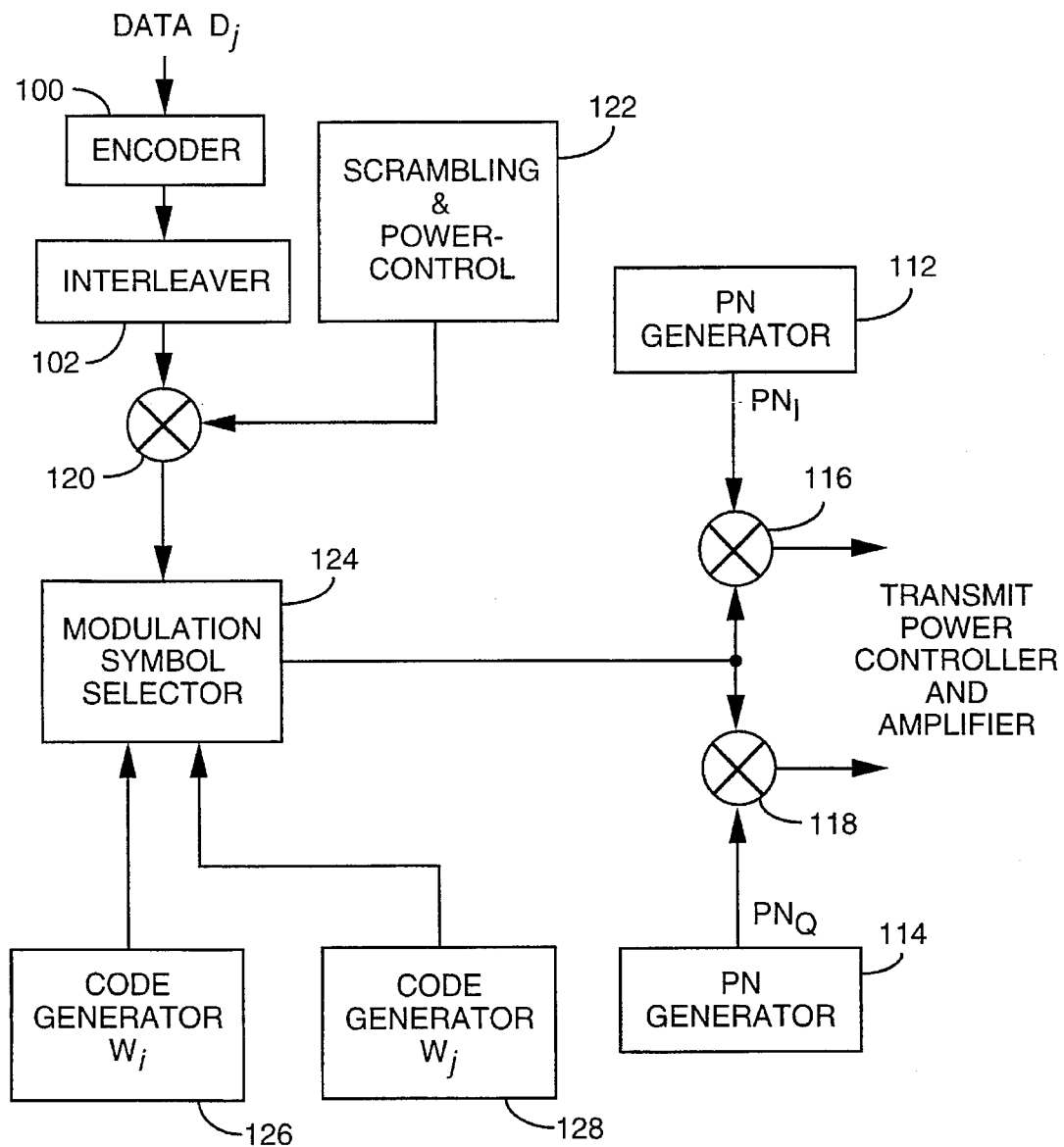
FIG. 4 illustrates a modulator using 2-ary modulation according to the principles of the present invention.

One implementation of a modulator useful in preparing user data for transmission using 2-ary modulation on a forward link is illustrated in FIG. 4. In FIG. 4, data is processed, as before, by encoder 100 and interleaver 102 before being multiplied by scrambling and power control factors in a multiplier 120. The scrambling factor is the decimated $PN_U$ sequence discussed previously, and the power control factor is a bit pattern typically used to compensate for energy variations induced in the data digitizing and encoding stages.

The output of multiplier 120 is transferred to a code mapper or modulation symbol selector 124 where the encoded interleaved symbol data is mapped into modulation symbols. The orthogonal sequences used for this modulation mapping can be generated in two appropriately configured generators 126 and 128, each having an output connected to selector 124. These generators are constructed using known techniques and circuit elements, such as the apparatus disclosed in U.S. Pat. No. 5,228,054 mentioned above or as otherwise known in the art. While the code generators are illustrated as separate structures, this is for clarity in illustration only and it will be readily apparent to those skilled in the art that they could form an integral portion of modulation symbol selector 124.

Orthogonal codes can be generated as needed according to selected index values or input variables for the desired functions. In the alternative, the desired functions, as assigned by the control processor, can be provided in the form of a pre-ordered list of functions used within the communication system, from which certain ones are chosen as needed. The code generators can be dynamically programmed such as using information provided in the sync or paging signals, so that the code sequences are changed each time the subscriber unit uses a new communication channel or link or gateway, or the sequences can be permanently assigned, as desired. In addition, two generators can be used to produce separate codes at the same time, or a single code generator can be used to provide two different codes at different times, each symbol interval, in response to the binary values of the data symbols.

Selector 124 receives the sequences and outputs one sequence from generator 126 when the input symbols are '0' and the orthogonal sequence from generator 128 when the symbols are '1'. Modulation symbol selector 124 is constructed using a variety of circuit elements and logic elements known to those skilled in the art, that simply enable a particular sequence to be output when either a '0' or '1' is received as an input. The orthogonal sequences output by one or more code generators can be simply selected by activating an electronic switching element, such as, but not limited to, a transistor or logic gate connected in series with each output. Alternatively, the sequences can be stored for use in local registers or memory elements that form part of modulation symbol selector 124.

The above technique can be extended to quaternary or 4-ary orthogonal sequences of length 2n chips, by using sequences which have the form:

$S_1(2n)=(W_i(n),W_i(n))$ $S_2(2n)=(W_i(n),\overline{W}_i(n))$ $S_3(2n)=(W_j(n),W_j(n))$ $S_4(2n)=(W_j(n),\overline{W}_j(n))$ At this level of modulation, each modulation symbol is a concatenation of two lower order orthogonal functions, that is one sequence 2n chips in length comprising two n-length sequences in series. Each of the modulation symbols builds on the n-length orthogonal, Walsh, functions normally used within the communication system and maintains orthogonality among the subscriber signals whether or not they all use the longer modulation symbols.

In the 4-ary configuration, 2 data symbols are used to select a given code sequence or set of Walsh functions for output as a modulation symbol. One potential mapping of input data symbols to modulation symbols is illustrated in Table I below. Those skilled in the art will readily understand that other mapping functions are usable within the teachings of the invention depending on specific communication system designs and the circuitry being employed to effect a mapping strategy.

TABLE I

| Symbol Data | Modulation Symbol/ Output Sequence |
| --- | --- |
| 00 | $(W_i(n), W_i(n))$ |
| 01 | $(W_i(n), \overline{W}_i(n))$ |
| 10 | $(W_j(n), W_j(n))$ |
| 11 | $(W_j(n), \overline{W}_j(n))$ |

This approach can be further extended to construct 16-ary orthogonal sequences of length 4n chips by allocating four orthogonal functions $W_i(n), W_j(n), W_k(n)$ and $W_p(n)$, and following the form:

$S_{x1}(4n)=(W_x(n),W_x(n),W_x(n),W_x(n))$ $S_{x2}(4n)=(W_x(n),\overline{W}_x(n),W_x(n),\overline{W}_x(n))$ $S_{x3}(4n)=(W_x(n),W_x(n),W_x(n),W_x(n))$ $S_{x4}(4n)=(W_x(n),\overline{W}_x(n),W_x(n),\overline{W}_x(n))$ where x=i,j,k,p, and i≠j≠k≠p. Which provides sequences such as:

$S_{i1}(32)=(W_i(8),W_i(8),W_i(8),W_i(8))$ $S_{i2}(32)=(W_i(8),\overline{W}_i(8),W_i(8),\overline{W}_i(8))$ $S_{i3}(32)=(W_i(8),W_i(8),\overline{W}_i(8),\overline{W}_i(8))$ $S_{i4}(32)=(W_i(8),\overline{W}_i(8),\overline{W}_i(8),W_i(8))$ $S_{j1}(32)=(W_j(8),W_j(8),W_j(8),W_j(8))$ $S_{j2}(32)=(W_j(8),\overline{W}_j(8),W_j(8),\overline{W}_j(8)) \ldots$ $S_{j3}(32)=(W_j(8),W_j(8),\overline{W}_j(8),\overline{W}_j(8))$ $S_{j4}(32)=(W_j(8),\overline{W}_j(8),\overline{W}_j(8),W_j(8))$ Using the above example for $W_i(8)$ this would become:

$S_{11}(32)$=1 1-1-1 1 1-1-1 1 1-1-1 1 1-1-1 1 1-1-1 1 1-1-1 1 1-1-1, $S_{13}(32)$=1 1-1-1 1 1-1-1 1 1-1-1 1-1-1-1-1 1 1-1-1 1 1-1-1 1 1-1-1 1 1, $S_{21}(32)$=1-1-1 1 1 1-1-1 1 1 1-1-1 1 1 1-1-1 1 1 1-1-1 1 1 1-1-1 1 1-1-1 1 1, and $S_{23}(32)$=1-1-1 1 1 1-1-1 1 1 1-1-1 1 1-1-1 1-1 1 1 1-1-1 1 1 1-1-1 1 1-1-1 1 1-1

At the 16-ary modulation level, every modulation symbol is a concatenation of four lower order orthogonal functions, that is a sequence with a length of 4n chips comprising 4 n-length sequences in series. In the 16-ary configuration, 4 data symbols are used to select a given code sequence or set of Walsh functions for output. An exemplary mapping of input symbols to modulation symbols is illustrated in Table II below. Again, those skilled in the art will readily understand that other mapping strategies are usable within the teachings of the invention.

TABLE II

Figure 5:
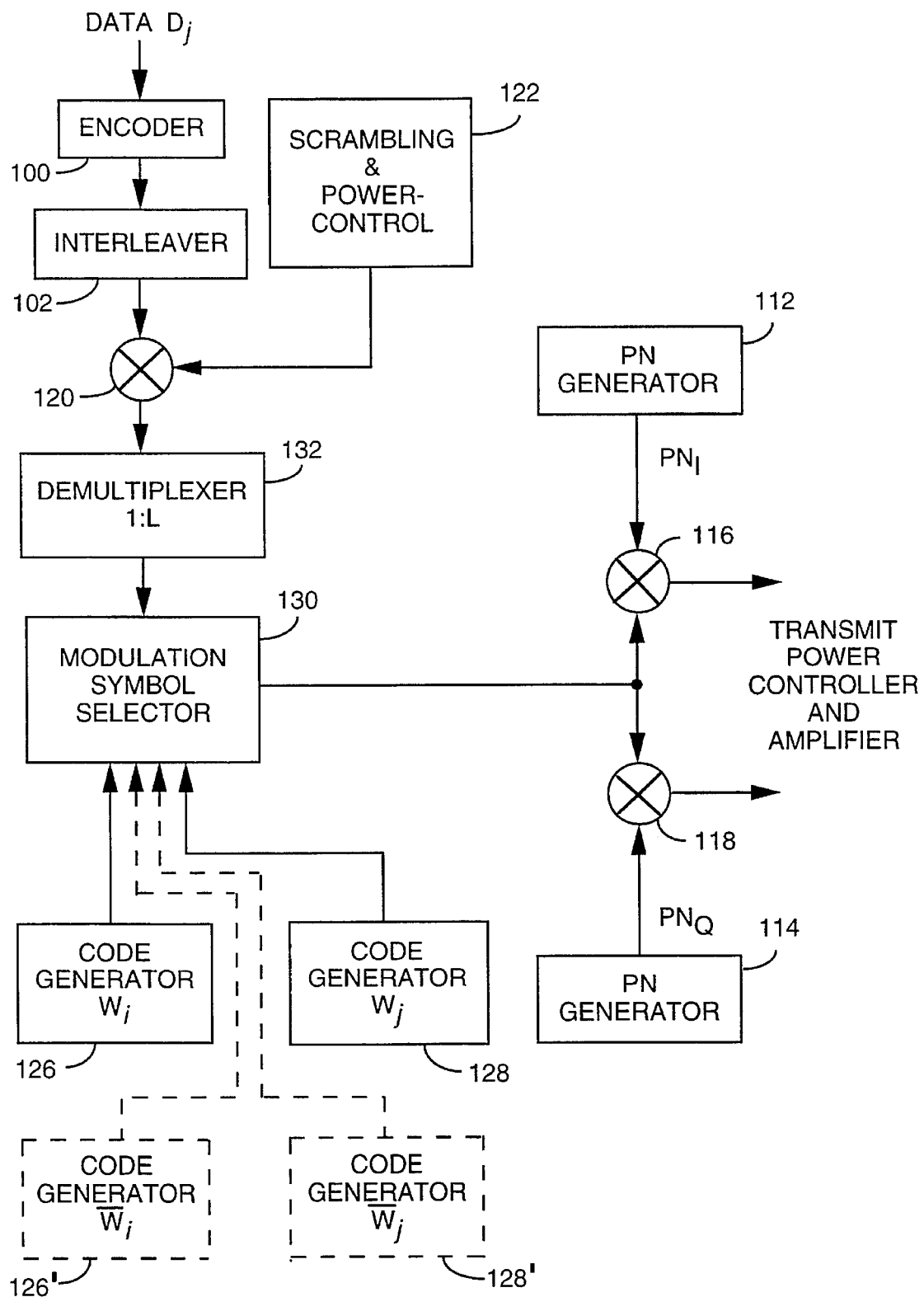
FIG. 5 illustrates a modulator using 4-ary modulation according to the present invention.

| Symbol Data | Sequence Pattern |
| --- | --- |
| 0000 | $(W_1(n), W_1(n), W_1(n), W_1(n))$ |
| 0001 | $(W_1(n), \overline{W}_1(n), W_1(n), \overline{W}_1(n))$ |
| 0010 | $(W_1(n), W_1(n), \overline{W}_1(n), \overline{W}_1(n))$ |
| 0011 | $(W_1(n), \overline{W}_1(n), \overline{W}_1(n), W_1(n))$ |
| 0100 | $(W_2(n), W_2(n), W_2(n), W_2(n))$ |
| 0101 | $(W_2(n), \overline{W}_2(n), W_2(n), \overline{W}_2(n))$ |
| 0110 | $(W_2(n), W_2(n), \overline{W}_2(n), \overline{W}_2(n))$ |
| 0111 | $(W_2(n), \overline{W}_2(n), \overline{W}_2(n), W_2(n))$ |
| 1000 | $(W_3(n), W_3(n), W_3(n), W_3(n))$ |
| 1001 | $(W_3(n), \overline{W}_3(n), W_3(n), \overline{W}_3(n))$ |
| 1010 | $(W_3(n), W_3(n), \overline{W}_3(n), \overline{W}_3(n))$ |
| 1011 | $(W_3(n), \overline{W}_3(n), \overline{W}_3(n), W_3(n))$ |
| 1100 | $(W_4(n), W_4(n), W_4(n), W_4(n))$ |
| 1101 | $(W_4(n), \overline{W}_4(n), W_4(n), \overline{W}_4(n))$ |
| 1110 | $(W_4(n), W_4(n), \overline{W}_4(n), \overline{W}_4(n))$ |
| 1111 | $(W_4(n), \overline{W}_4(n), \overline{W}_4(n), W_4(n))$ | where $\overline{W}(n)$ again denotes the logical complement of $W(n)$, that is, $\overline{W}(n)=-W(n)$ and $W(1)=1$ The 4-ary modulation technique can be implemented using a modification of the modulator illustrated in FIG. 4, as shown in FIG. 5. In FIG. 5, the data is processed, as before, by encoder 100 and interleaver 102 before being multiplied by scrambling and power control factors in multiplier 120. The output of multiplier 120 is again transferred to an orthogonal code or modulation symbol selector, here 130, where the encoded interleaved symbol data is mapped into the desired modulation symbols. The binary symbols at the output of the multiplier are grouped into 2-bit 'vectors' which are mapped to one modulation symbol. This mapping occurs according to a binary representation of a modulation symbol index. That is, each modulation symbol has one of four corresponding index values or designations ranging from '00' to '11', for 4-ary modulation, and the binary value of the data symbols are used to select that index value.

The orthogonal sequences used for the modulation mapping are provided by generators 126 and 128, each having an output connected to selector 130. The selector can be constructed so that it manipulates the input sequences to provide the logical complement of each sequence it receives, as needed, or a second series of generators, as shown by the dashed outlines labeled 126' and 128', can be employed to provide either desired complementary sequences or a complementing function for those from code generators 126, 128.

To effect 4-ary modulation, modulation symbol selector 130 receives the lower order code sequences and outputs one (higher order) longer sequence comprising the code received from generator 126, or its logical complement, when a pair of input symbols have one set of values, such as '00' or '01'; and a different long sequence comprising the code received from generator 128, or its logical complement, when the pair of input symbols have another set of values, such as '10' or '11'. To provide for the use of two encoded data symbols, 2-bit vectors, for the selection process, a one-to-L (1:L) demultiplexer 132 is connected in series with selector 130. The value of L is set equal to two for 4-ary modulation.

Selector 130 is constructed using a variety of circuit and logic elements known to those skilled in the art, that enable a particular modulation symbol to be output in response to each symbol input pattern. The orthogonal code sequences output by each code generator can be simply selected by activating a series of electronic switching elements, such as, but not limited to, a transistor or logic gate connected in series with each output. Alternatively, the sequences can be stored for use in local registers or memory elements that form part of modulation symbol selector 130, once they are generated. As before, the sequence generators can be dynamically programmed, as desired, using information from the gateway control processor.

Figure 6:
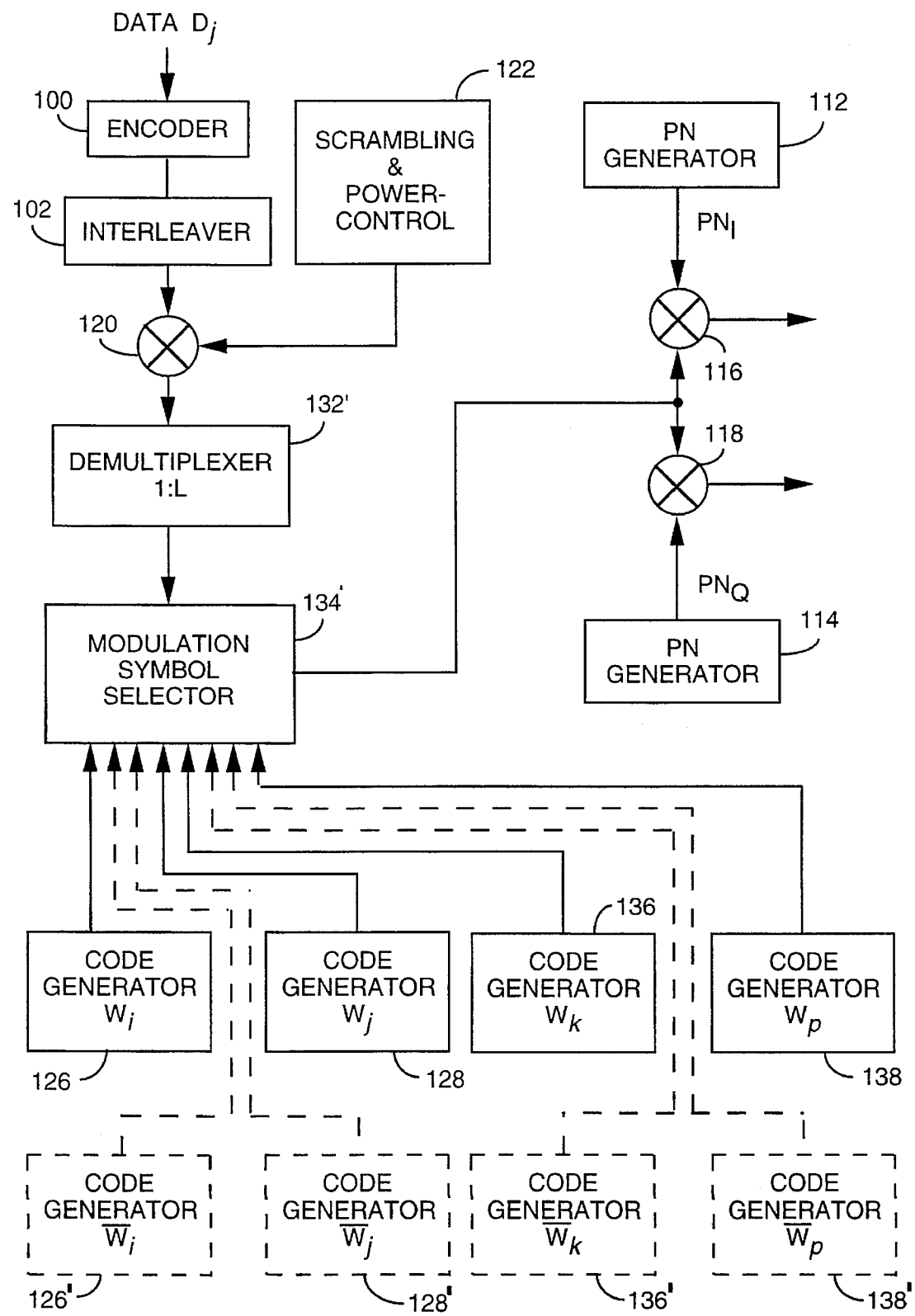
FIG. 6 illustrates a modulator using 16-ary modulation according to the present invention.

One or more look-up tables or similar memory structures can also be employed to store pre-selected code sequences, including logical compliments, for later recall in response to specific input symbols. Apparatus known in the art such as, but not limited to, random access and read only memories and programmable logic arrays can be used to implement such tables. In this configuration, the look-up table is generally accessed directly by the symbol data using the binary symbol vector as an address or index pointer for a particular modulation symbol entry in the table. The modulation symbol output is automatically selected by the input value. A single circuit element of this type might be used to perform the combined functions of modulation symbol selector 130, and generators 126 and 128. A code sequence selector can also increment or add offsets to the index address specified by the symbol values to allow four input values (M) to select sets of sequences from the 128 available. This incrementing can be set or selected using commands from the gateway control processor One implementation of a useful modulator portion for preparing the subscriber signals using 16-ary modulation is illustrated in FIG. 6. In FIG. 6, the data is again processed by encoder 100 and interleaver 102 before being multiplied by scrambling and power control factors in multiplier 120. The output of multiplier 120 is then transferred by 1:L demultiplexer 132' to an orthogonal code or modulation symbol selector 134 where the encoded interleaved symbol data is mapped into the modulation symbols. In this configuration, the binary symbols at the output of the multiplier are grouped into 4-bit 'vectors' and mapped to one modulation symbol according to a binary representation of the modulation symbol index.

In this apparatus, the orthogonal sequences used for the modulation mapping are provided by a series of four appropriately configured orthogonal code generators 126, 128, 136, and 138, each having an output connected to code selector 134. The selector can manipulate the input sequences to provide the logical complement of each sequence or a second series of generators (126', 128', 136', and 138') can be employed that provides either the complementary output or a complementing function. Depending on the circuitry employed it could be more cost effective and provide additional speed to employ separate, additional, sequence generators for providing the complementary sequences.

To effect 16-ary modulation, selector 134 receives the lower order n-length code sequences and outputs one 4n-length sequence, comprising the sequence received from generator 126, or its logical complement, when a set of four input symbols obtain one pre-defined set of values, such as '0000' or '0010'. Selector 134 outputs a different 4n-length orthogonal sequence, consisting of the sequence received from generator 128, or its logical complement, when the set of input symbols has another set of values, such as '0100' or '0011'; another 4n-length orthogonal sequence, consisting of the sequence received from generator 136, or its logical complement, when the set of input symbols has yet another set of values, such as '1001' or '1010'; and yet another 4n-length orthogonal sequence, consisting of the sequence received from generator 138, or its logical complement, when the set of input symbols has still another set of values, such as '1100' or '1111'. To provide for the use of four encoded data symbols for the selection process, demultiplexer 132', connected in series with modulation symbol selector 134, uses a value of four for L.

As above, modulation symbol selector 134 is constructed using a variety of circuit and logic elements known to those skilled in the art, that enable a particular modulation symbol to be output in response to each data symbol input pattern. The orthogonal sequences output by each code generator can be selected by activating a series of electronic switching elements, such as, but not limited to, transistors or logic gates connected in series with each output. Alternatively, the sequences can be stored for use, once they are generated, in local registers or memory elements that form part of selector 134. Communication system 10 specific ROMs or programmable logic arrays could be employed as hard-wired mapping elements, as desired. A look-up table or similar memory structure can also be employed, as discussed above, as part of the structure of modulation symbol selector 134 to store pre-selected functions or code sequences, including logical compliments, for later recall in response to specific input symbols.

In either of the above modulation apparatus, using modulation symbols that are multiples of shorter n-chip length codes means that smaller length functions or code sequences are generally accumulated in registers or memory elements within selector 134, to form the larger 2n- and 4n-chip length sequences. These sequences are then made available for use as the particular scheme demands. This 'construction' process for larger sequences allows communication system 10, gateways, and the subscriber units to remain very flexible in the type of orthogonal functions used so that either n-, 2n-, or 4n-chip length sequences might be made available, under control of processor 70, depending on the type of modulation scheme desired. Sequence generators can be activated and de-activated as wanted, and different users can receive different length sequences, to address user specific reception problems.

While the longest sequence is generally preferred, command information from the gateways can instruct the subscriber units which length of sequence is preferred in that communication system, or a preselected first choice of code sequence length or actual code sequences for use in demodulation can be pre-stored in the subscriber unit for retrieval and use when non-coherent demodulation is desired.

In general, applicant recognized that by allocating $2^k$ orthogonal or Walsh functions (k is an integer) for modulation symbols that span a code length of L·n Walsh chips, M-ary modulation is realized, where $M=2^k \cdot L$. Furthermore, the energy of each modulation symbol $E_s$ can be determined from the code rate r and the energy per information bit $E_b$ according to the relationship:

$$E_s = r \cdot L \cdot E_b \quad (1)$$

Any user terminal or subscriber unit receiver has to integrate a received signal over a time interval of L·n code chips before deriving energy values or energies for received modulation symbols. Therefore, by increasing the modulation level or order M, the value of L is larger and the energy of each modulation symbol $E_s$ is increased so that error performance in tracking received signals decreases. That is, increasing the modulation order to say 16-ary (M=16, $2^k=4$, L=4), the energy of each modulation symbol $E_s$ is increased by a factor of four, the increase in the sequence length. This added energy allows subscriber unit receivers to obtain improved performance in tracking the phase of the communication signals, which approaches that of coherent demodulation techniques.

The flexibility and overall advantages of the above modulation scheme can be further understood by examining exemplary configurations for non-coherent signal demodulation apparatus that can be easily implemented in the subscriber units or user terminals of communication system 10. Three principle configurations are discussed below in reference to FIGS. 7–9 which provide support for non-coherent demodulation. These configurations can be classified as either single-finger or multiple-finger receivers using non-coherent demodulation, or as multiple-finger receivers using both non-coherent and coherent demodulation.

For clarity in illustration and in discussing the operation of these receivers, a 16-ary modulation scheme is assumed, although others can certainly be used. In addition, only a single signal path is illustrated, however, the I and Q path or channel signals are generally processed separately along parallel paths. Therefore, the signal processing elements illustrated in FIGS. 7–9 would be substantially duplicated, unless some form of time sharing is used, such as for orthogonal function sources. At the same time, analog signal reception and processing stages and related analog-to-digital conversion elements are not shown. The operation and use of such elements are known to those skilled in the art and are also discussed in U.S. Pat. No. 5,103,459, referenced above.

Figure 7:
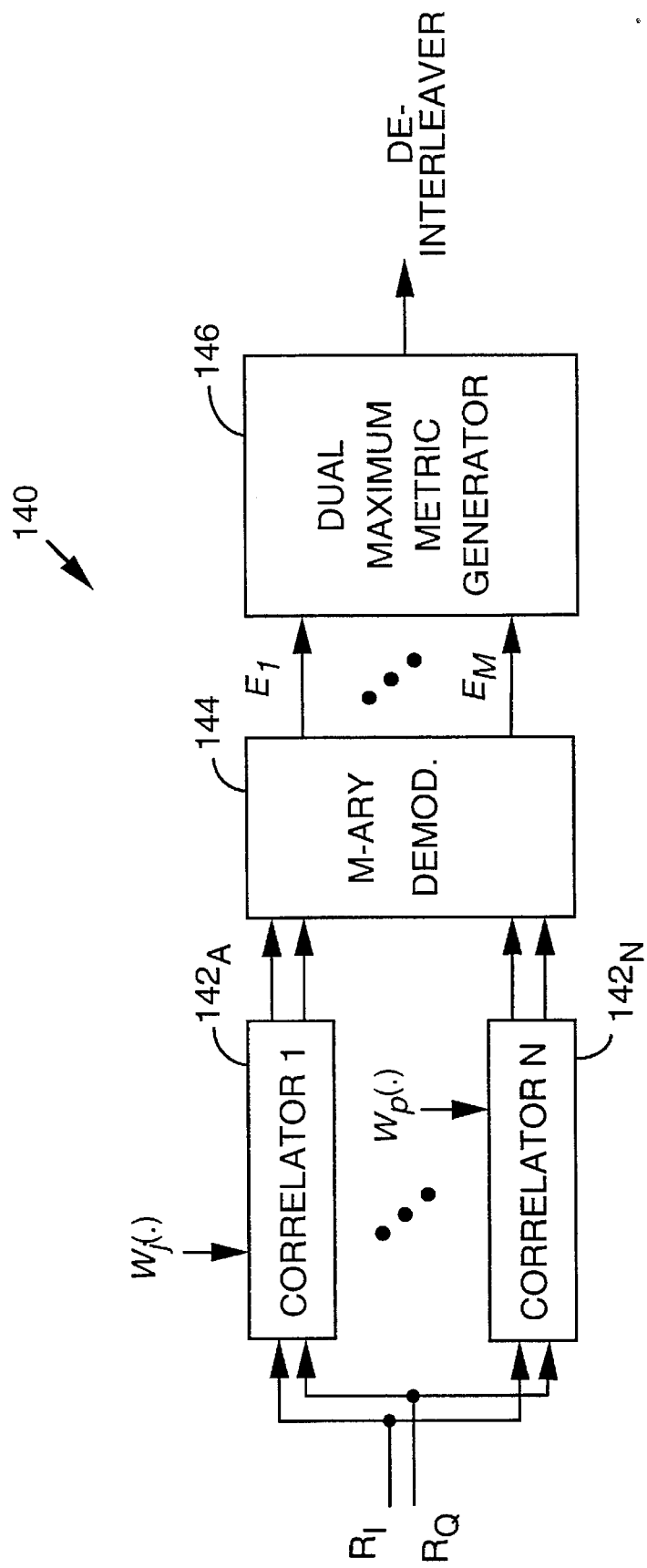
FIG. 7 illustrates a block diagram of a single finger receiver implementing non-coherent demodulation according to the principles of the present invention.

An exemplary single-finger communication signal receiver that only employs non-coherent signal demodulation is shown in block diagram form in FIG. 7. In FIG. 7, a digital data receiver 140 is shown using three major functional blocks or sets of components for signal demodulation. The first component set is a series or bank of $2^k$ correlators 142, or $142_A$–$142_N$, where $N=2^k$, the second is an M-ary demodulator 144, and the third is a Dual Maximum Metric (DMM) generator 146.

The function of correlators 142 is to correlate the incoming signal with $2^k$ orthogonal, Walsh, functions every modulation symbol time, here $T_{walsh}$. The modulation symbol time is predetermined within the communication system according to the length of the orthogonal functions being used, and the factor 'L' discussed above for multiple-orthogonal-function length modulation sequences. The number of correlators 142 used in demodulator 140 ($2^k$) is determined by the number of functions used to generate the modulation symbols. In the case of 16-ary modulation this number is four (k=2). Therefore, the correlation operation is performed by a bank of four correlators. However, when k is very large, say greater than four, the correlation operation can be performed by a single FHT device to gain efficiency by directly mapping symbol code into modulation code space. At the same time, as mentioned below, the assignment of correlators can be dynamic so that more correlators are made available for signal processing when M is large and fewer when M is small, providing great system flexibility.

The correlated received signal output R for each correlator 142 ($142_A$, $142_B$, $142_C$, $142_D$) can be conveniently defined with respect to each Walsh function $W_i$ at time $N \cdot T_{walsh}$ by the expression:

$$R_{W_i}(N) = \sum_{p=1}^{n} W_{ip} R\left( \left( N-1+\frac{p}{n} \right) T_{walsh} \right), \quad (2)$$

where $W_i = (W_{i1}, W_{i2}, \ldots W_{in})$ represents the $i^{th}$ Walsh function consisting of n Walsh chips and having a duration of $T_{walsh} = nT_{chip}$; and R(.) represents a complex output function from a matched filter for the chip waveform at a time (.). Therefore, $R_{w_i}(N)$ is the complex output of a correlator applying a Walsh function $W_i$.

For non-coherent demodulation, a subscriber unit or user terminal processes the incoming signal through correlators $142_{A-N}$ and stores the I and Q modulation symbol values for $2^k$ Walsh functions, here four, over every time interval $T_{walsh}$. Then, after $L \cdot T_{walsh}$ seconds (here $L=4$), or appropriate units of time, the stored values are operated on by M-ary demodulator 144 which estimates or determines a received energy for each modulation symbol. The received energy is estimated based on the hypothesis that a modulation symbol $i=1, \ldots, M$, has been transmitted during that appropriate time interval. The I and Q modulation symbols can be accumulated or stored within correlators 142, a storage portion of demodulator 144, or using other well known storage elements such as random access memory, latches, or registers, etc.

Under this approach, symbol energies can be established according to the relationships:

$$E_1 \equiv \text{Energy}\_s_2(N) = \|R_{w_j}(N)\|^2 \quad (3)$$

$$E_2 \equiv \text{Energy}\_s_1(N) = \|R_{w_i}(N)\|^2 \quad (4)$$

$$E_1(N) \equiv \text{Energy}\_s_2(N) = \|R_{w_j}(N)\|^2 \quad (5)$$

where $i \neq j$, for 2-ary demodulation;

$$E_1 \equiv \text{Energy}\_s_1(2N) = \|R_{w_i}(N) + R_{w_i}(2N)\|^2 \quad (6)$$

$$E_1 \equiv \text{Energy}\_s_2(2N) = \|R_{w_i}(N) - R_{w_i}(2N)\|^2 \quad (7),$$

$$E_3 \equiv \text{Energy}\_s_3(2N) = \|R_{w_j}(N) + R_{w_j}(2N)\|^2 \quad (8)$$

$$E_4 \equiv \text{Energy}\_s_4(2N) = \|R_{w_j}(N) - R_{w_j}(2N)\|^2 \quad (9)$$

where $i \neq j$, for 4-ary demodulation; and for 16-ary demodulation:

$$E_{x1} \equiv \text{Energy}\_S_{x1}(4N) = \|R_{w_x}(N) + R_{w_x}(2N) + R_{w_x}(3N) + R_{w_x}(4N)\|^2 \quad (10)$$

$$E_{x2} \equiv \text{Energy}\_S_{x2}(4N) = \|R_{w_x}(N) - R_{w_x}(2N) + R_{w_x}(3N) - R_{w_x}(4N)\|^2 \quad (11)$$

$$E_{x3} \equiv \text{Energy}\_S_{x3}(4N) = \|R_{w_x}(N) + R_{w_x}(2N) - R_{w_x}(3N) - R_{w_x}(4N)\|^2 \quad (12)$$

$$E_{x4} \equiv \text{Energy}\_S_{x4}(4N) = \|R_{w_x}(N) - R_{w_x}(2N) - R_{w_x}(3N) + R_{w_x}(4N)\|^2 \quad (13)$$

where $x \in i,j,k,p$ and $i \neq j \neq k \neq p$.

In the general case, L successive outputs from the bank of correlators, or FHT device, are used to establish the energies for $2^k \cdot L = M$ modulation symbols. As described before, the original encoded/interleaved data transmission maps a predetermined set of code symbol bits into one modulation symbol. Then for reception, the modulation symbol, or index, is mapped into a predetermined set of code symbol bits. In the case of 16-ary modulation, this means that each modulation symbol is mapped into four code symbol bits by demodulator 144.

If the index of the modulation symbols having the maximum energy at the output of the M-ary demodulator 144 is T, then:

$$E_T = \max_{t \in (1,\ldots,M)} \{E_1, \ldots E_t, \ldots, E_M\}. \quad (14)$$

The code symbol bits associated with the maximum modulation symbol energy, T, output by demodulator 144 could be considered the hard decision bits (after de-interleaving) for use by a receiver decoder. In the configuration of FIG. 7, Dual Maximum Metric (DMM) generator 146 computes a difference between the maximum energy associated with each code symbol bit when it is a '1' and a '0,' and produces a q-bit quantized soft decision from the difference of these energies. Each modulation symbol provides four data symbols, so the output from DMM generator 146 is four q-bit soft decisions for each received modulation symbol. Additional description of the operation of a DMM generator is found in co-pending U.S. patent application Ser. No. 08/083,110, entitled "NONCOHERENT RECEIVER EMPLOYING A DUAL-MAXIMA METRIC GENERATION PROCESS," which is assigned to the same assignee as the present invention, and which is incorporated herein by reference.

DMM generator 146 can be implemented in either parallel or serial modes of operation. That is, either all of the symbol bits from demodulator 144 are processed substantially at the same time along parallel processing paths, or each symbol is processed one-at-a-time, along a single processing path. In the serial approach additional time is required to produce the metric calculation and output final soft decision data. The advantage of the parallel approach is that all of the soft decisions are ready at the end of the last bit processing time interval and control logic for these functions is relatively simple, but generally requires additional circuit elements, with a corresponding larger volume than that needed for a serial approach. However, a serial approach might be selected for some operations because of the smaller circuit area or volumetric requirements, and the fact that the additional time required to produce soft decisions does not create any limitations.

The maximum modulation symbol energy and its respective index output by demodulator 144 are accumulated, such as by using a memory element or a latch and hold circuit. The dual maximum metric is produced by inputting into DMM generator 146, such as by reading from a memory location, or otherwise, those energies associated with the complement of each maximum code-symbol bit. There are $\log_2(L)$ maximum modulation symbol energies for the complement of each maximum index bit (code-symbol bit), providing four code-symbol bits for 16-ary modulation, and four maximum modulation symbol energies for the complement of each code-symbol bit. The maximum energies associated with the complement of the code symbol bit are called complementary code symbol energies.

A soft decision is then produced in DMM 146 by first taking the difference between the maximum modulation symbol energy accumulated from demodulator 144 and each of its complementary code symbol energies. Then the resulting difference value is either inverted or not, depending on the value of the maximum code symbol bit for the 'energy pair' used to produce the difference. This provides a soft decision metric output from DMM 146 which is then transferred directly to a de-interleaver in the case of a single finger receiver, which is generally followed by a decoder such as but not limited to a Viterbi decoder.

Figure 8:
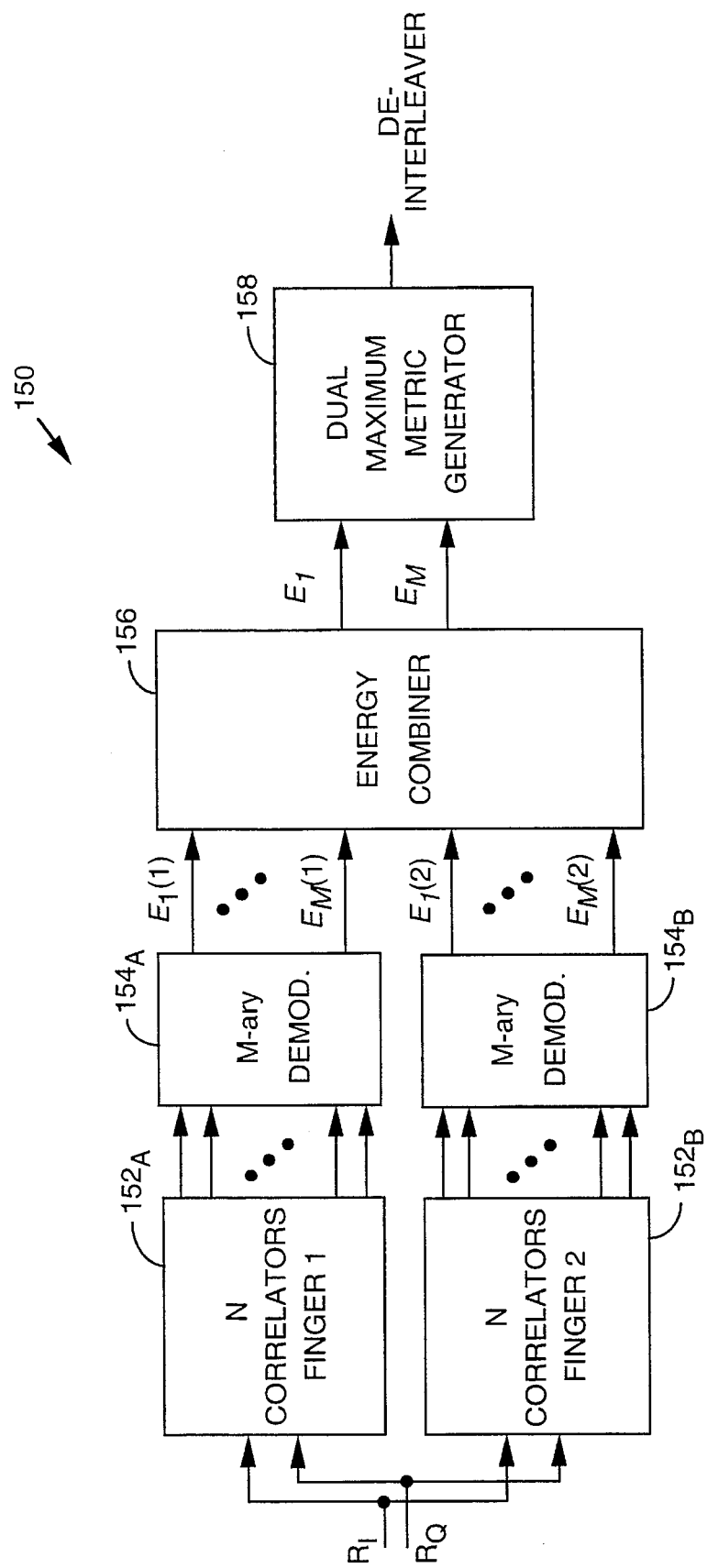
FIG. 8 illustrates a block diagram of a multiple finger receiver implementing non-coherent demodulation.

An exemplary multiple-finger communication signal receiver that only employs non-coherent signal demodulation is shown in block diagram form in FIG. 8. In this embodiment, 16-ary modulation is again assumed and the receiver employs at least two fingers for de-modulating user signals from different communication paths. This architecture or configuration supports the allocation of different orthogonal functions to different fingers to provide processing for signals transferred using different paths, such as different satellite beams.

In spread spectrum communication system 10, space diversity available from using multiple paths is used to advantage. When using satellite repeaters to communicate with user terminals or subscriber units, multiple satellites are used since overlapping beams, having different frequencies or polarization modes, from one satellite would not provide the necessary diversity. Using two or more satellites to establish multiple communication links means that multiple Walsh code sequences are used for each subscriber unit, at least one for each path or link. In some systems that satellite itself may have its own PN sequence, which may also require additional demodulation and hand-off circuitry.

Using the present invention, gateways in communication system 10 might allocate one set of orthogonal functions for transmission to a system user or signal recipient using a beam A, and another set of functions for transmission to the same system user using a beam B. Both signals can be processed accordingly, substantially simultaneously. At the same time, each set of orthogonal functions can be used to produce modulation symbols of different lengths as between the two beams.

In FIG. 8, a digital receiver 150 is shown using four principle functional blocks or sets of components for signal demodulation. The first component set is two series or banks of N correlators $152_A$ and $152_B$, where $N=2^k$; the second is two M-ary demodulators $154_A$ and $154_B$; the third is an energy combiner 156; and the fourth is a Dual Maximum Metric (DMM) generator 158.

Receiver 150 transfers the incoming signal to correlators $152_A$ and $152_B$ which again correlate each of the incoming signals with $2^k$ orthogonal, Walsh, functions every modulation symbol time $T_{walsh}$, which is predetermined within the communication system., as discussed above. The number of correlators 152 used in each finger of receiver 150 ($2^k$) is determined, as before, by the number of functions used to generate the modulation symbols. In the case of 16-ary modulation this number is four. Therefore, the correlation operation is performed by two banks of four correlators each. However, when k is very large, the correlation operation can be performed by a couple of FHT devices to gain efficiency.

In this configuration, a subscriber unit processes incoming signals through each set of correlators 152 and stores the resulting I and Q modulation symbol values for $2^k$ Walsh functions over every time interval $T_{walsh}$. After $L \cdot T_{walsh}$ seconds, the stored values for each signal in each finger are operated on by one of the M-ary demodulators $154_A$ or $154_B$, which estimates or determines a received symbol energy, based on the hypothesis that a modulation symbol has been received during that appropriate time interval. The I and Q channel modulation symbols can be accumulated or stored within correlators 152, a storage portion of demodulators 154, or using other well known storage elements such as, but not limited to, random access memory, latches, or registers.

The outputs of demodulators $154_A$ and $154_B$ in fingers 1 and 2, each comprise the sixteen energy values that correspond to the sixteen modulation symbols, as described in relation to FIG. 7. For example, energy values $\{E_1(1), \ldots E_i(1), \ldots, E_{16}(1)\}$ are output from finger 1, while energy values $\{E_1(2), \ldots E_i(2), \ldots, E_{16}(2)\}$ are output from finger 2. The outputs from both demodulators, $154_A$, $154_B$, are then logically combined or summed in an energy combiner 156.

Energy combiner 156 sums the energies for each respective modulation symbol index in a corresponding pairwise fashion and produces sixteen combined energies for each modulation symbol. Note that any desired de-skewing operation can also be realized in this configuration by using a memory that stores intermediate results, and time shifting the output.

The final result of the combination or summing process is a combined energy associated with each modulation symbol of index T given by $E_i=E_t(1)+E_t(2)$. In some embodiments, the energy values might be weighted before combining, as desired, to accommodate varying reception quality or attenuation among the signals. The combined energy values from energy combiner 156 are then transferred to DMM generator 158 which produces the dual maximum metric as described in relation to FIG. 7 above. This metric value is then transferred to the de-interleaver and decoding circuitry as before.

An exemplary receiver using multiple fingers for both coherent demodulation and non-coherent demodulation is shown in block diagram form in FIG. 9. In FIG. 9, there are 'i' fingers used to construct this rake receiver configuration. Here, the 16-ary modulation format is again assumed, and a receiver with at least four fingers is used, two implementing non-coherent demodulation and two implementing coherent demodulation. The upper two fingers, i=1,2, are shown being used for coherent demodulation while the lower two, i=3,4, are used for non-coherent demodulation. However, such an arrangement is only for purposes of illustration, and the coherent/non-coherent nature of the fingers could be alternated or grouped according to some other demodulation strategy. Those skilled in the art will readily understand that other combinations or numbers of non-coherent and coherent demodulation circuits or fingers can be used, and that a symmetric or equal number of fingers need not be assigned to each demodulation mode.

In FIG. 9, a digital data receiver 160 is shown using seven principle functional blocks or sets of components for signal demodulation. The first component set is two series or banks 162 and 164 of $2^k$ correlators each; the second is two M-ary demodulators $166_A$ and $166_B$; the third is an energy combiner 168; the fourth is a Dual Maximum Metric (DMM) generator 170; the fifth is two coherent demodulators 172 and 174; the sixth is an amplitude combiner 176; and the seventh is a composite Metric Generator (CMG) 178.

For non-coherent signal demodulation, receiver 160 transfers the incoming signal to correlators 162 and 164 in receiver fingers 3 and 4 (i=3,4) which again correlate each incoming signal with $2^k$ orthogonal functions every modulation symbol time $T_{walsh}$, as discussed above. The number of correlators used in each processing finger is determined, as before, by the number of functions used to generate the modulation symbols, here being four. Therefore, this correlation operation is performed by two banks of four correlators each, with two FHT devices being used to gain efficiency when k is appropriately large.

As seen in FIG. 9, the digital receiver portion of the subscriber unit processes each of the incoming signals through each of the two sets of correlators 162 and 164 and stores the resulting I and Q modulation symbol values for $2^k$ Walsh functions over every time interval $T_{walsh}$. After $L \cdot T_{walsh}$ seconds, the stored values for each signal in each finger are operated on by one of the M-ary demodulators $166_A$ or $166_B$ which estimates or determines a received energy. The outputs of each of demodulators $166_A$ or $166_B$ in each finger 1–4 are the sixteen energy values corresponding to the sixteen modulation symbols, as described in relation to FIG. 7. For example, energy values $\{E_1(1), \ldots E_i(1), \ldots E_{16}(1)\}$ are output from finger 3, while energy values $\{E_1(2), \ldots E_i(2), \ldots, E_{16}(2)\}$ are output from finger 4.

The outputs from demodulators $166_A$ and $166_B$ are then logically combined or summed using an energy combiner 168. Energy combiner 168 sums the energies for each respective modulation symbol index in a corresponding pairwise fashion and produces sixteen combined energies for each modulation symbol. As before, the energy values might be weighted before combining, as desired. DMM generator 170 then receives the combined energies and produces the dual maximum metric as described in relation to FIG. 7 above.

At the same time, for coherent signal demodulation, receiver 160 transfers the incoming signal to two coherent signal demodulators 172 and 174 in receiver fingers 1 and 2 (i=1,2) where it is correlated with specific orthogonal codes. Here, the codes are not only know, but the basic timing and phase of the communication signal is known so that there is generally no need to demodulate over multiple code sequence possibilities to formulate a metric or to track the signal.

In coherent signal processing, each of demodulators 172 and 174 uses a single correlator for applying a single code sequence, a phase rotator, and an amplitude combiner, and can be implemented as a relatively conventional coherent CDMA demodulation element, such as by using commercially available ASIC components. Further discussion of such demodulation elements and techniques is found in U.S. Pat. No. 5,309,474 entitled "SYSTEM AND METHOD FOR GENERATING SIGNAL WAVEFORMS IN A CDMA CELLULAR TELEPHONE SYSTEM," which is assigned to the assignee of the present invention.

The output of each of the coherent signal processing fingers in receiver 160 is an amplitude A for the received signal using the Walsh function or code sequence cover that was allocated to this user. The amplitude output by each coherent demodulator of finger i, i=1,2 is denoted here as $A_i$. Generally, since a user terminal can receive transmissions from different beams within communication system 10, each using a different orthogonal Walsh function, each finger demodulates the spread spectrum signal or channel that was allocated to the recipient user on a particular satellite beam.

Each amplitude Ai output from demodulators 172 and 174 is combined in an amplitude combiner 176. Amplitude combiner 176 sums the energies for all of the respective signal paths or fingers in a corresponding fashion and produces a combined energy value for each modulation symbol. As before, the amplitudes might be weighted before, or during, the combining process, as desired.

Metric combiner 178 then receives all metric information from amplitude combiner 176 and DMM generator 170 and combines it to make a reliable soft metric for decoding. The output of the metric combiner 178 is transferred to a de-interleaver which is followed by an appropriate decoder, such as a Viterbi decoder.

What has been described, then, is a new technique modulating data for generating spread spectrum communication signals. This modulation technique allows the use of both coherent and non-coherent modulation/demodulation schemes in a communication system, providing greater flexibility in signal processing. This also allows improved signal reception when very low or non-existent pilot signal power is available. Multiple orthogonal code sequences $W_i$, where i=1, 2, 4, . . . , N, are used to modulate encoded data for transmission. A demodulator scheme is then used that first correlates a received signal with each of the potential orthogonal codes and produces modulation symbols which are mapped into potential encoded and interleaved data in a demodulator. This results in energy values for modulation symbols which are processed by a DMM, along with complementary values, to provide soft decision bits. The soft decision bits are in turn processed by an appropriate de-interleaver and decoder to generate data. The length of the modulation code sequences, and the number used for modulation are dynamically assignable, as desired.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What I claim is:

1. A method for modulating data in a spread spectrum communication system in which information is communicated by forming data symbols into digital communication signals, comprising the steps of:

generating N orthogonal functions of length n having a predefined recursive relationship among each other, N being a power of 2;

forming M mutually orthogonal modulation symbols having a length Ln using said N orthogonal functions and respective inverses thereof, where M equals the product of L and N; and mapping data symbols into said preselected modulation symbols by selecting one of said modulation symbols according to binary values for every log M data symbols.

2. The method of claim 1 wherein M is at least 2 and less than or equal to 64.

3. The method of claim 1 wherein said communication signals being modulated are transmitted to communication system subscribers on a forward communication link.

4. The method of claim 1 wherein said orthogonal functions comprise Walsh functions.

5. The method of claim 1 wherein said mapping step comprises the steps of:

selecting a first orthogonal function for transmission when data symbols in said digital communication signals have one binary value; and selecting a second orthogonal function for transmission when data symbols in said digital communication signals have a second binary value.

6. The method of claim 1 wherein said forming and mapping steps comprise steps of:

generating first and second n-length orthogonal functions;

generating a first 2n-length code sequence using said first orthogonal function twice, when a pair of data symbols in said digital communication signals have a first value;

generating a second 2n-length code sequence using said first orthogonal function and its inverse, when a pair of data symbols have a second value;

generating a third 2n-length code sequence using said second orthogonal function twice, when a pair of data symbols have a third value; and generating a fourth 2n-length code sequence using said second orthogonal function and its inverse, when a pair of data symbols have a fourth value.

7. The method of claim 1 wherein preselected first, second, third, and fourth n-length orthogonal functions are used to produce modulation symbols, and said forming and mapping steps comprise generating sixteen 4n-length code sequences in response to binary values of sets of four data symbols, said code sequences comprising:

four sequences in which said first, second, third, and fourth functions are repeated four times, respectively, each in response to one of four values of the data symbols; and three sets of sequences, each in response to one of twelve values of the data symbols, in which said first, second, third, and fourth functions are repeated two times, respectively, and accompanied by two inversions of said repeated sequences, with the relative position of the inversions in each sequence in each of said sets being shifted from inversions in other sequences so as to maintain substantial orthogonality.

8. The method of claim 1 wherein said step of mapping comprises the step of applying said data symbols to a Fast Hadamard Transformer so as to transform data symbols into preselected modulation symbols.

9. The method of claim 1 wherein said step of mapping comprises the step of applying said data symbols to a modulation symbol storage device so as to transform data symbols into preselected modulation symbols.

10. The method of claim 1 wherein modulated communication signals are transferred from a gateway type base station using at least one satellite based repeater to at least one remote subscriber unit within said communication system.

11. The method of claim 1 wherein said communication system comprises a wireless telephone/data communication system in which remote users are located within a plurality of cells and communicate information signals to at least one gateway, using code division multiple access (CDMA) spread spectrum type communication signals.

12. The method of claim 1 further comprising the steps of:

receiving a plurality of data signals to be transmitted to communication system subscribers over separate user channels; and encoding each data signal to produce coded data symbols for each user channel.

13. Apparatus for modulating communication signals in a spread spectrum communication system in which information is communicated by forming coded data symbols into digital communication signals, comprising:

means for generating N orthogonal functions of length n having a predefined recursive relationship among each other, N being a power of 2;

means for forming M mutually orthogonal modulation symbols of length Ln, using said N orthogonal functions and respective inverses thereof, where M equals the product of L and N; and means for mapping data symbols into said modulation symbols, connected to receive data symbols and orthogonal modulation symbols, for selecting one of said modulation symbols according to binary values for every log M data symbols.

14. The apparatus of claim 13 wherein:

said means for generating comprises at least one orthogonal function generator which outputs first and second orthogonal functions, respectively; and said means for forming comprises selection means connected to receive said data symbols and said first and second functions, which responds to binary values for said data symbols by selecting said first orthogonal function as an output when said symbols have one value and selecting said second orthogonal function as an output when data symbols have a second value.

15. The apparatus of claim 14 comprising first and second orthogonal function generators.

16. The apparatus of claim 13 wherein M is at least 2 and less than or equal to 64.

17. The apparatus of claim 13 further comprising means for transmitting said communication signals being modulated to communication system subscribers on a forward link.

18. The apparatus of claim 13 wherein said orthogonal functions comprise Walsh functions.

19. The apparatus of claim 13 wherein said mapping means comprises means for selecting a first orthogonal function for transmission when data symbols in said digital communication signals have one binary value, and for selecting a second orthogonal function for transmission when data symbols in said digital communication signals have a second binary value.

20. The apparatus of claim 13 wherein said forming and mapping means comprise:

at least one orthogonal function generator which outputs first and second n-length orthogonal functions, respectively; and selection means connected to receive said data symbols and said first and second functions, and respond to binary values for said data symbols by selecting:

a first 2n-length code sequence for output, comprising said first orthogonal function used twice, when a pair of data symbols in said digital communication signals have a first value;

a second 2n-length code sequence for output, comprising said first orthogonal function and its inverse, when a pair of data symbols have a second value;

a third 2n-length code sequence for output, comprising said second orthogonal function used twice, when a pair of data symbols have a third value; and a fourth 2n-length code sequence for output, comprising said second orthogonal function and its inverse, when a pair of data symbols have a fourth value.

21. The apparatus of claim 20 comprising first and second orthogonal function generators.

22. The apparatus of claim 13 wherein said mapping means comprises a Fast Hadamard Transformer which is configured to transform data symbols into preselected modulation symbols.

23. The apparatus of claim 13 wherein said mapping means comprises a modulation symbol storage device which is configured to receive data symbols and output preselected modulation symbols.

24. The apparatus of claim 13 further comprising means for transferring said modulated communication signals from a gateway type base station using at least one satellite based repeater to at least one remote subscriber unit within said communication system.

25. A method for demodulating communication signals in a spread spectrum communication system in which information is communicated by orthogonally encoded communication signals, comprising the steps of:

receiving spread spectrum communication signals having a common carrier frequency modulated using M mutually orthogonal modulation symbols having a length Ln formed by using a preselected number of n-length orthogonal functions and respective inverses thereof, where M equals the product of L and said preselected number;

inputting said signals into at least two sets of N correlators, and correlating said signals with said preselected number of n-length orthogonal functions, in parallel;

applying correlated output signals to corresponding demodulators for each set of correlators, and demodulating said correlated signals into M energy values in each demodulator representing each of said M mutually orthogonal modulation symbols respectively;

combining the resulting M energy values from each demodulator into a single set of M energy values; and mapping said single set of energy values into energy metric data using a dual maximum metric generation process.

26. The method of claim 25 wherein M is at least 2 and less than or equal to 64.

27. The method of claim 25 wherein said communication signals being demodulated are received by communication system subscribers on a forward communication link.

28. The method of claim 25 wherein said orthogonal functions comprise Walsh functions.

29. The method of claim 25 wherein said preselected number of orthogonal functions is at least 2 and less than or equal to 4.

30. The method of claim 25 wherein modulated communication signals are transferred from a gateway type base station using at least one satellite based repeater to at least one remote subscriber unit within said communication system.

31. The method of claim 25 wherein said communication system comprises a wireless telephone/data communication system in which remote users are located within a plurality of cells and communicate information signals to at least one gateway, using code division multiple access (CDMA) spread spectrum type communication signals.

32. The method of claim 25 further comprising the steps of:

inputting said signals to at least one coherent demodulator, and demodulating said correlated signals into at least one amplitude value;

combining any resulting amplitude values from each coherent demodulator into a single amplitude value; and combining said single amplitude value and an output of said dual maximum metric generation process into composite metric values for data symbols.

33. Apparatus for demodulating communication signals in a spread spectrum communication system in which information is communicated by orthogonally encoded communication signals, comprising:

means for receiving spread spectrum communication signals having a common carrier frequency modulated using M mutually orthogonal modulation symbols having a length Ln using a preselected number N of n-length orthogonal functions and respective inverses thereof, where M is the product of L and said preselected number;

at least two sets of N correlators connected to receive said spread spectrum signals and correlate said signals with said preselected number of n-length orthogonal functions, in parallel;

a plurality of demodulators each connected to receive outputs of one corresponding set of correlators so as to demodulate said correlated signals into M energy output values in each demodulator representing each of said M mutually orthogonal modulation symbols respectively;

means for combining the resulting M energy values from each demodulator into a single set of M energy values; and means for mapping said energy values into energy metric values using a dual maximum metric generation process.

34. The apparatus of claim 33 further comprising:

at least one coherent demodulator connected to receive said spread spectrum signals and demodulate said signals into at least one amplitude value;

an amplitude combiner connected to receive an output of said coherent demodulator and combine resulting amplitude values from each coherent demodulator into a single amplitude value; and an energy combiner connected to receive said single amplitude value and an output of said dual maximum metric generation process and combine them into composite metric values for data symbols.

35. The apparatus of claim 34 comprising at least two coherent demodulators.

36. The apparatus of claim 33 wherein said preselected number of functions is 64 or less.

37. The apparatus of claim 33 wherein M is at least 2 and less than or equal to 64.

38. The apparatus of claim 33 wherein said orthogonal functions comprise Walsh functions.

39. A spread spectrum communication system, comprising:

a plurality of gateway type base stations each including at least one communication signal transmitter that transmits signals comprising data symbols to active system users, comprising:

a plurality of function generating means each for providing at least one of a plurality of orthogonal functions of a plurality of orthogonal functions of length n having a predefined recursive relationship among each other;

means for selecting N of said orthogonal functions for each active system user, N being a power of 2;

means for forming M mutually orthogonal modulation symbols of length Ln, for each active system user using said N selected orthogonal functions and respective inverses thereof, where M is the product of L and N;

means for mapping data symbols into said modulation symbols for each active system user, connected to receive data symbols and orthogonal modulation symbols for each active system user, and for selecting one of said modulation symbols according to binary values for every log M data symbols;

a plurality of spreading means each connected to said means for mapping for receiving modulation symbols for respective users and for producing a spread spectrum data signal; and combination means for combining modulation symbols for substantially all active users receiving signals over a common carrier frequency into a communication signal;

a plurality of mobile communication units, each including a mobile receiver, comprising:

means for selecting and receiving a spread spectrum communication signal from at least one gateway; and demodulation means connected to the means for selecting and receiving, for providing modulation symbols for respective users by demodulating the received spread spectrum communication signal.

40. The system of claim 39, wherein said mobile receivers further comprise:

at least two sets of N correlators connected to receive said spread spectrum communication signals and correlate said signals with said preselected number of n-length orthogonal functions, in parallel;

a plurality of demodulators each connected to receive outputs of one corresponding set of correlators so as to demodulate said correlated signals into M energy output values in each demodulator representing each of said M mutually orthogonal modulation symbols respectively;

means for combining the resulting M energy values from each demodulator into a single set of M energy values; and means for mapping said energy values into energy metric values using a dual maximum metric generation process.

41. A method of generating a spread spectrum communication signal, comprising the steps of:

generating a plurality of orthogonal functions of length n, each being generated according to a respective function of a plurality of orthogonal functions;

receiving a plurality of system subscriber data signals comprising data symbols to be transmitted to active system subscribers over separate user channels;

forming M mutually orthogonal modulation symbols for each channel having a length Ln using N of said plurality of orthogonal functions and respective inverses thereof, where M equals the product of L and N;

mapping data symbols for each channel into said preselected modulation symbols for that channel by selecting one of said modulation symbols according to binary values for every log M data symbols; and combining streams of said modulation symbols for all channels after said mapping step into a serial data stream spread spectrum data signal.

42. The method of claim 41 wherein said communication system comprises a wireless telephone/data communication system in which remote users are located within a plurality of cells and communicate information signals to at least one gateway, using code division multiple access (CDMA) spread spectrum type communication signals.

43. The method of claim 41 wherein M is at least 2 and less than or equal to 64.

* * * * *